United States Patent
Yamamoto et al.

[15] 3,697,508
[45] Oct. 10, 1972

[54] PROCESS FOR PREPARING BENZODIAZOCINES AND BENZODIAZONINES

[72] Inventors: Hisao Yamamoto, Nishinomiya-shi; Shigeho Inaba, Takarazuka-shi; Tadashi Okamoto, Ashiya-shi; Toshiyuki Hirohashi, Kobe; Kikuo Ishizumi, Minoo-shi; Michihiro Yamamoto, Takarazuka-shi; Isamu Maruyama, Minoo-shi; Kazuo Mori, Kobe; Tsuyoshi Kobayashi, Minoo-shi, all of Japan

[73] Assignee: Siemitomo Chemical Company, Ltd., Osaka, Japan

[22] Filed: Dec. 9, 1968

[21] Appl. No.: 782,451

[30] Foreign Application Priority Data

Dec. 12, 1967 Japan ..................42/79925
Dec. 18, 1967 Japan ..................42/81297
Dec. 21, 1967 Japan ..................42/82272
Dec. 21, 1967 Japan ..................42/82275
Jan. 30, 1968 Japan ..................43/5908
Jan. 30, 1968 Japan ..................43/5909
Feb. 5, 1968 Japan ..................43/7357
Feb. 13, 1968 Japan ..................43/8952
Feb. 21, 1968 Japan ..................43/11299
Feb. 23, 1968 Japan ..................43/11638
March 3, 1968 Japan ..................43/15246

[52] U.S. Cl. ..........260/239.3, 424/244, 260/326.15, 260/326.12, 260/326.13, 260/326.16

[51] Int. Cl. ..............................................C07d 53/00
[58] Field of Search ..............................260/239.3 B

[56] References Cited

UNITED STATES PATENTS 3,294,782  12/1966  Sulkowski..............260/239.3

OTHER PUBLICATIONS

Elderfield " Heterocyclic Compounds" Vol. 3, pages 8– 13 (Wiley) (1952).
Dambal et al., " J. Indian Chem. Soc.," Vol. 42, No. 2, pages 112– 114 (1965).
Harley–Mason et al., " J. Chem. Soc." 1963, page 2,565.

Primary Examiner—Henry R. Jiles
Assistant Examiner—Robert T. Bond
Attorney—Stevens, Davis, Miller & Mosher

[57] ABSTRACT

Novel 2-oxo-6-phenyl-1,5-benzodiazocine and 2-oxo-7-phenyl-1,6-benzodiazonine derivatives are prepared by such a manner that an indole-2-alkylamine derivative is formed by reducing an indole-2-aliphatic acid amide or thioamide, or by other processes, and oxidizing the resulting indole-2-alkylamine derivative. These 2-oxo-6-phenyl-1,5-benzodiazocine and 2-oxo-7-phenyl-1,6-benzodiazonine derivatives are useful as tranquilizers, muscle-relaxants and hypnotics.

42 Claims, No Drawings

PROCESS FOR PREPARING BENZODIAZOCINES AND BENZODIAZONINES

This invention relates to novel benzodiazocine and benzodiazonine derivatives and to a process for the preparation of the same. More particularly, the invention pertains to novel benzodiazocine and benzodiazonine derivatives and to a process for preparing the same, said derivatives being represented by the general formula:

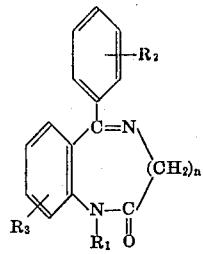

(I)

wherein $R_1$ signifies a hydrogen atom or a lower alkyl group having up to 2 carbon atoms; $R_2$ and $R_3$ each signifies a hydrogen atom or a halogen atom; and $n$ signifies 2 or 3.

In the compounds represented by the abovementioned formula (I), the halogen atom includes chlorine, bromine, iodine and fluorine atoms; the alkyl group includes methyl and ethyl groups; and

includes groups of —CH$_2$—CH$_2$— and —CH$_2$—CH$_2$—CH$_2$—.

The compounds represented by the formula (I) are useful as tranquilizers, muscle-relaxants and hypnotics.

The process for producing these compounds is carried out by treating an 2-aminoalkylindole derivative represented by the formula:

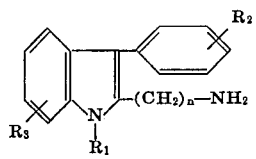

(II)

wherein $R_1$, $R_2$, $R_3$ and $n$ are as defined above, or an acid salt thereof, with an oxidizing agent.

We have found, unexpectedly, that 8- or 9- membered new nitrogen-containing heterocyclic compounds of the formula (I) can be smoothly and economically prepared in high yields by reacting a 2-aminoalkyl-indole derivative having the formula (II), or a salt thereof, with an appropriate oxidizing agent.

This process for converting a 5-membered ring compound into an 8- or 9-membered compound by ring expansion reaction has not heretofore been described or suggested in any literature.

The 2-aminoalkylindole derivatives of the formula (II), which are used in the present invention, are novel compounds unknown to the literature. These compounds can be easily prepared by reducing corresponding indole-aliphatic acid amides or thioamides, cyanomethyl-indoles or nitroalkenyl-indoles; provided that when cyanomethyl-indoles are used, there are obtained benzodiazocine derivatives. All these indole derivatives also are novel compounds.

The novel indole-aliphatic acid amides or thioamides are represented by the formula:

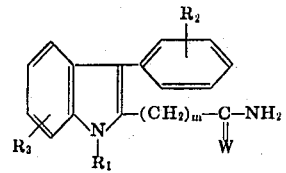

(IV)

wherein $R_1$, $R_2$ and $R_3$ are as defined above; $m$ is 1 or 2 and W is an oxygen or sulfur atom. The indole-aliphatic acid amides are easily prepared by converting indole-aliphatic acids represented by the formula:

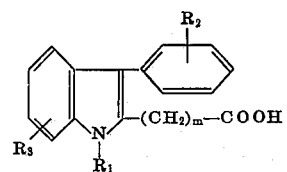

(V)

wherein $R_1$, $R_2$, $R_3$ and $m$ are as defined above, or reactive derivatives thereof, to amides with ammonia. Further, the indole-aliphatic acid thioamides are obtained by treating the thus prepared amides with phosphorus pentasulfide.

The novel cyanomethyl-indoles are represented by the formula:

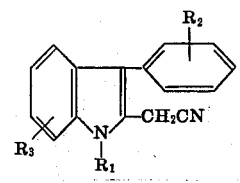

(VI)

wherein $R_1$, $R_2$ and $R_3$ are as defined above. These compounds are obtained by reacting with a metal cyanide a quaternary ammonium salt represented by the formula:

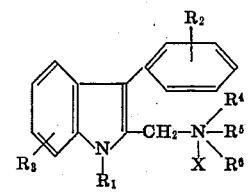

(VII)

wherein $R_1$, $R_2$ and $R_3$ are as defined above; X is a halogen atom; and $R^4$, $R^5$ and $R^6$ are lower alkyl groups and the said quaternary ammonium salt of the formula (VII) is derived from a corresponding dialkylamino methylindole derivatives. In the above, the dialkylaminomethylindole derivatives, which are starting materials for the preparation of the compound represented by the formula (VII), are obtained by reducing an indole-2-carboxy-amide or thioamide of the formula:

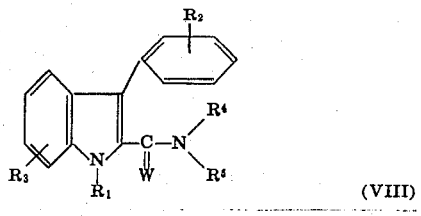

(VIII)

wherein $R_1$, $R_2$, $R_3$, $R_4$, $R_5$ and W are as defined above. The compounds of the formula (VIII) are also novel, and the N-substituted carboxy-amides are obtained by reacting an indole-2-carboxylic acid or a reactive derivative thereof with a corresponding substituted amine, while the N-substituted carboxy-thioamides are obtained by treating said amides with phosphorus pentasulfide.

The novel nitroalkenyl-indole derivatives represented by the formula:

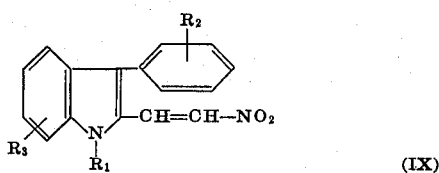

(IX)

wherein $R_1$, $R_2$ and $R_3$ are as defined above, are prepared by the reaction of indole-2-aldehyde derivatives represented by the formula:

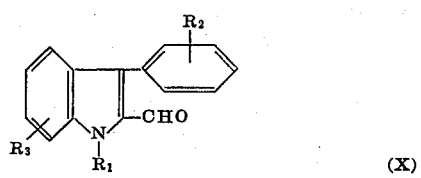

(X)

wherein $R_1$, $R_2$ and $R_3$ are as defined previously, with nitromethane. The aldehyde derivatives of the formula (X) are easily prepared in accordance with the present invention by oxidizing indole-2-methanol derivatives of the formula:

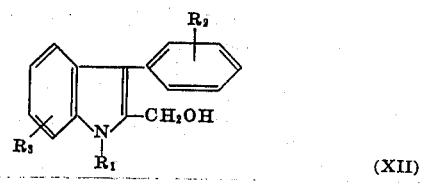

(XII)

wherein $R_1$, $R_2$ and $R_3$ are as defined above, which alcohols can be obtained by reducing indole-2-carboxylic acids of the formula:

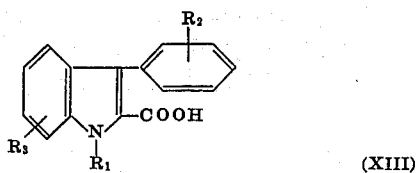

(XIII)

wherein $R_1$, $R_2$ and $R_3$ are as defined above, or reactive derivatives thereof. Alternatively, the aldehyde derivatives of the formula (X) may be prepared from 1-indolylcarbonyl-2-p-tolylsulfonylhydrazine derivatives represented by the formula:

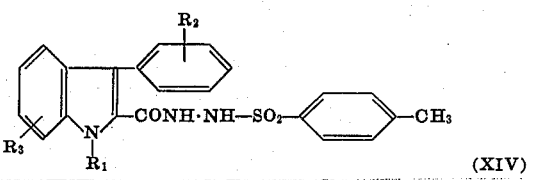

(XIV)

wherein $R_1$, $R_2$ and $R_3$ are as defined above, which are obtained by reacting the carboxylic acids of the formula (XIII) or reactive derivatives thereof with hydrazine, and then reacting the resulting indole-carboxylic acid hydrazides represented by the formula:

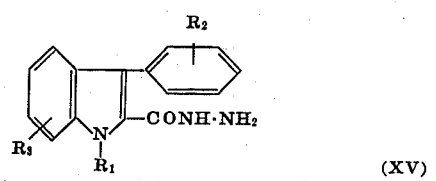

(XV)

wherein $R_1$, $R_2$ and $R_3$ are as defined above, with reactive derivatives of p-toluenesulfonic acid.

In accordance with the present invention, the process for producing the benzodiazocine and benzodiazonine derivatives of the formula (I) may be represented, in general, by the following reaction schema:

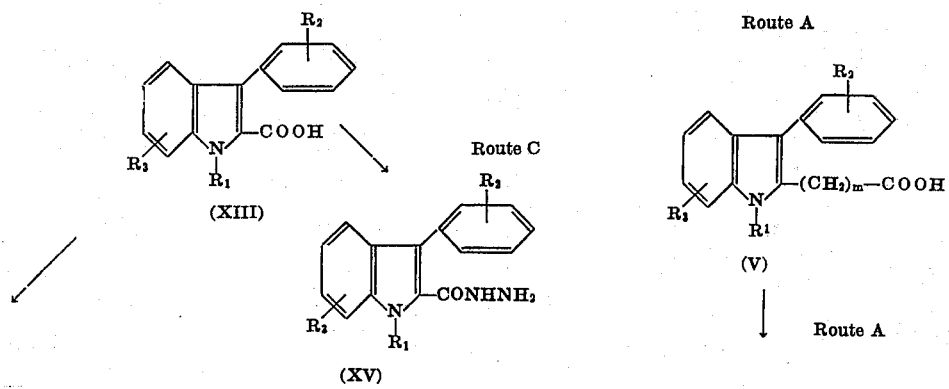

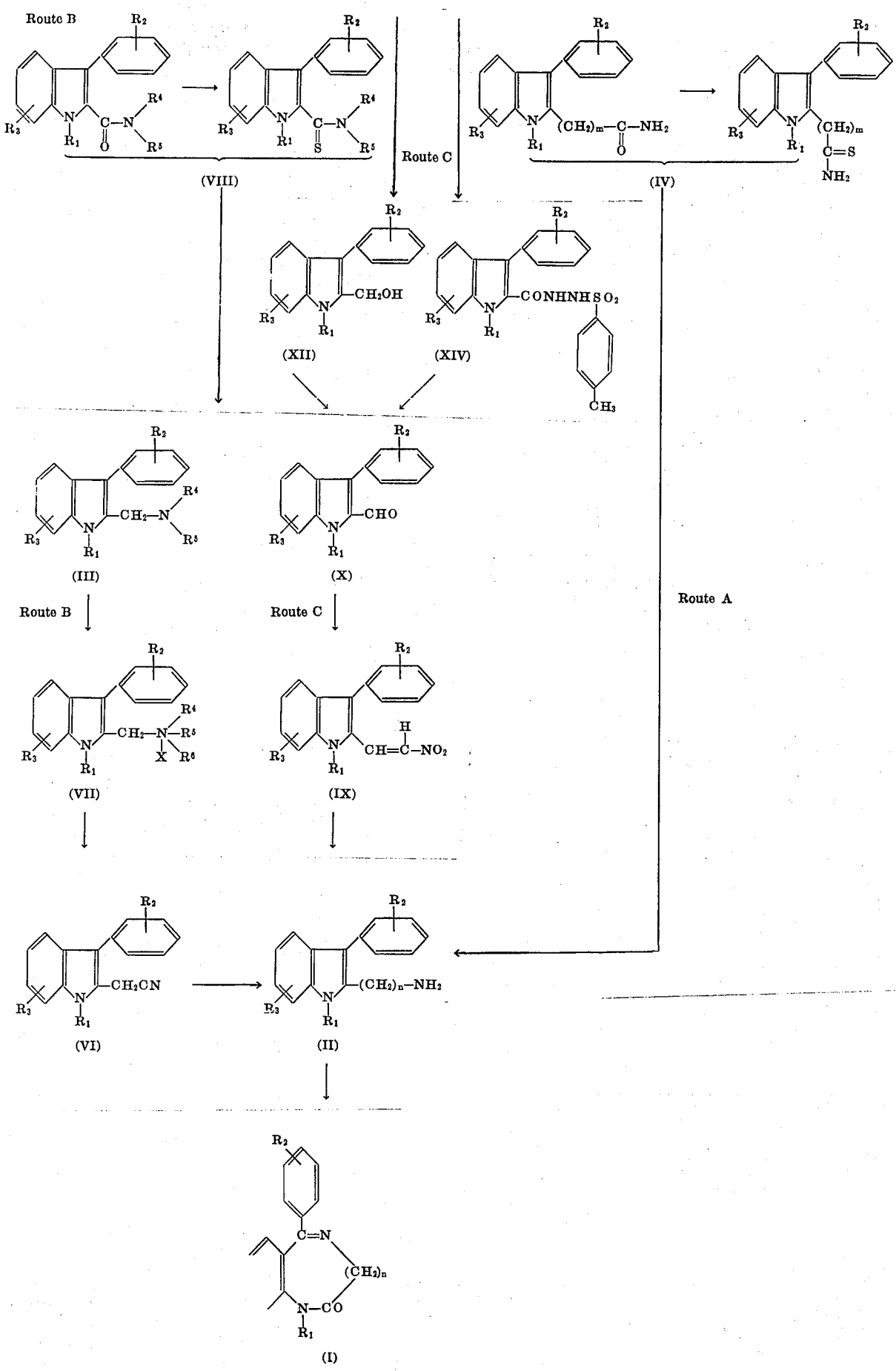

The benzodiazocine and benzodiazonine derivatives obtained according to the above-mentioned process may also be obtained in the form of acid addition salts of hydrochloric, sulfuric, nitric, phosphoric, acetic, succinic and the like acids.

The indole-2-carboxylic acid derivatives of the formula (XIII) used as starting material in this invention can be prepared, for example, by treating an aromatic diazonium salt with an α-acetylphenyl propionic acid ester to give an indole-2-carboxylic acid ester derivative and hydrolyzing the said indole-2-carboxylic acid ester derivative, after 1-alkylation of it, if desired. Alternatively, 3-phenylindole-2-carboxylic acid derivative also is obtained by reacting, for example, a phenylpyruvic acid derivative or an ester derivative thereof with a phenylhydrazine derivative. From the thus obtained indole-2-carboxylic acid derivatives, corresponding reactive acid derivatives such as acid halides and acid anhydrides may be prepared.

The indole-2-aliphatic acid derivatives of the formula (V), which are another starting materials, are obtained in the manner similar to the method mentioned above.

All of these processes proceed smoothly and give the objective products in high yields, and therefore these procedures are quite advantageous, in practice.

An object of the present invention is to provide novel benzodiazocine and benzodiazonine derivative of the formula (I).

Another object is to provide novel salts of benzodiazocine and benzodiazonine derivatives by treating the corresponding derivatives of the formula (I) with a mineral acid such as hydrochloric, sulfuric, nitric or phosphoric acid, or with an organic acid such as maleic, fumaric, succinic, formic or acetic acid.

A further object is to provide a process for preparing novel indole derivatives.

Other objects of the invention will become apparent from the following description.

In order to accomplish the above objects, the present invention provides benzodiazocine and benzodiazonine derivatives represented by the formula (I) and a process for producing the same, which comprises reacting a 2-aminoalkylindole derivative represented by the formula (II), or a salt thereof, with an oxidizing agent.

Further, the present invention provides a process for producing salts of the benzodiazocine and benzodiazonine derivatives of the formula (I) which comprises reacting a 2-aminoalkylindole derivative of the formula (II), or a salt thereof, with an oxidizing agent to yield a benzodiazocine or benzodiazonine derivative of the formula (I), and then reacting said derivative with a mineral acid such as hydrochloric, sulfuric, nitric or phosphoric acid, or with an organic acid such as maleic, fumaric, succinic, formic or acetic acid.

In preparing the benzodiazocine and benzodiazonine derivatives, i.e., 8- and 9-membered heterocyclic compounds, according to this invention, the 2-aminoalkylindole derivatives represented by the formula (II), or salts thereof, are reacted with an appropriate oxidizing agent. The oxidizing agent for this process includes, for example, ozone, hydrogen peroxide, peracetic acid, perbenzoic acid, chromic acid and potassium permanganate.

The oxidation reaction is desirably effected at room temperature. If necessary, however, the reaction may be carried out at lower or higher temperatures. The oxidation products are then allowed to stand at room temperature or above in a suitable solvent such as pyridine, toluene, xylene acetic acid or the like in the presence or absence of an acid catalyst, e.g., hydrochloric, sulfuric or phosphoric acid, whereby an objective compound is produced.

The objective compounds can be separated from the reaction mixtures by extraction, with or without prior neutralization. If desired, the products are further purified by recrystallization from a suitable solvent such as ethanol, isopropanol or the like.

The objective compounds obtained according to the above-mentioned process may also be isolated in the form of acid addition salts by treatment with an acid, e.g., hydrochloric, hydrobromic, sulfuric, phosphoric, formic or acetic acid.

According to the process of the present invention, there are produced such compounds and acid addition salts thereof as shown below.

1-Methyl-2-oxo-6-phenyl-1,2,3,4-tetrahydro-1,5-benzodiazocine,
2-Oxo-6-phenyl-1,2,3,4-tetrahydro-1,5-benzodiazocine,
1-Methyl-2-oxo-7-phenyl-1,2,3,4,5-pentahydro-1,6-benzodiazonine,
2-Oxo-7-phenyl-1,2,3,4,5-pentahydro-1,6-benzodiazonine,
1-Methyl-2-oxo-6-phenyl-8-chloro-1,2,3,4-tetrahydro-1,5-benzodiazocine,
2-Oxo-6-phenyl-8-chloro-1,2,3,4-tetrahydro-1,5-benzodiazocine,
1-Methyl-2-oxo-7-phenyl-9-chloro-1,2,3,4,5-pentahydro-1,6-benzodiazonine,
2-Oxo-7-phenyl-9-chloro-1,2,3,4,5-pentahydro-1,6-benzodiazonine, and their hydrochloric acid, hydrobromic acid and sulfate.

In the next place, the process for preparing the 2-aminoalkylindole compounds of the formula (II) used in one embodiment of the preparation of the objective compounds will be explained below.

The above compounds are obtained through three routes [A], [B] and [C], using as starting materials the indole-2-carboxylic acid derivatives of the formula (V) and (XIII) or their reactive compounds, as shown in the aforesaid reaction schema.

These procedures are illustrated in detail as follows:

Route A:

An indole-2-aliphatic acid amide (IV) employed in this invention is prepared by reacting indole-2-aliphatic acid represented by the formula:

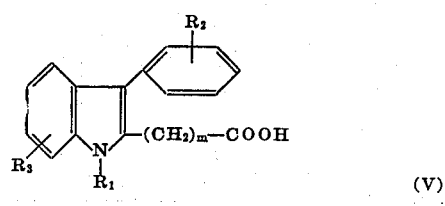

(V)

wherein $R_1$, $R_2$, $R_3$ and $m$ are as defined above or reactive derivatives thereof, with ammonia.

As the reactive derivatives in the above process, there are acid halides, esters and acid anhydrides. The acid halides include, for example, acid chlorides and acid bromides; and the esters include, for example, methyl esters, ethyl esters, tertiary butyl esters, benzyl esters and p-nitrophenyl esters.

Acid anhydrides such as a mixed anhydride described in "Organic Reactions," Vol.12, p.157 (1962) can be used.

An amidation of the indole-2-aliphatic acid derivative (V) or the reactive derivative thereof, is carried out by reacting the same with ammonia. The amidation is advantageously effected in the presence of a solvent. Examples of the solvent usable in the process of the present invention include an alcohol such as methanol or ethanol, or an organic solvent such as ether, acetone, benzene, toluene, xylene, chlorobenzene or chloroform or liquid ammonia. In the present reaction, ammonia can be used by introducing gaseous ammonia to a reaction mixture or adding alcoholic ammonia (such as methanolic ammonia, ethanolic ammonia) or aqueous ammonia to a reaction mixture. Because the reaction usually proceeds at room temperature, heating or cooling is not always necessary. However, the reaction may be controlled by heating or cooling, if desired.

The indole-2-aliphatic acid amide derivatives obtained in the present invention can be converted to the corresponding thioamide derivatives by treatment with, for example, phosphorous pentasulfide.

In the present invention, examples of the indole-2-aliphatic acid amide or thioamide derivative (IV) include the following compounds:

3-Phenyl-2-indolylacetamide,
5-Chloro-3-phenyl-2-indolylacetamide,
6(or 4)-chloro-3-phenyl-2-indolylacetamide,
7-Chloro-3-phenyl-2-indolylacetamide,
5-Bromo-3-phenyl-2-indolylacetamide,
5-Chloro-3-phenyl-2-indolylpropionamide,
6(or 4)-chloro-3-phenyl-2-indolylpropionamide,
7-Chloro-3-phenyl-2-indolylpropionamide,
5-Bromo-3-phenyl-2-indolylpropionamide,
3-(o-Chlorophenyl)-2-indolylacetamide,
3-(o-Chlorophenyl)-2-indolylpropionamide,
5-Chloro-3-(o-chlorophenyl)-2-indolylacetamide,
5-Chloro-3-(o-chlorophenyl)-2-indolylpropionamide,
3-(o-Fluorophenyl)-2-indolylacetamide,
3-(o-Fluorophenyl)-2-indolylpropionamide,
5-Chloro-3-(o-fluorophenyl)-2-indolylacetamide,
5-Chloro-3-(o-fluorophenyl)-2-indolylpropionamide,
5-Chloro-3-(m-chlorophenyl)-2-indolylpropionamide,
5-Chloro-3-(p-chlorophenyl)-2-indolylpropionamide,
5-Chloro-1-methyl-3-phenyl-2-indolylacetamid,
5-Chloro-1-methyl-3-phenyl-2-indolylpropionamide,
5-Chloro-3-(o-chlorophenyl)-1-methyl-2-indolylacetamide,
5-Chloro-3-(o-bromophenyl)-1-methyl-2-indolylacetamide,
5-Chloro-3-(o-fluorophenyl)-1-methyl-2-indolylacetamide,
5-Chloro-3-(o-fluorophenyl)-1-methyl-2-indolylpropionamide,
5-Chloro-3-(p-chlorophenyl)-1-methyl-2-indolylpropionamide,
5-Chloro-1-ethyl-3-phenyl-2-indolylpropionamide,
5-Chloro-3-(o-chlorophenyl)-1-methyl-2-indolylpropionamide,
5-Chloro-1-ethyl-3-phenyl-2-indolylacetamide,
5-Chloro-3-phenyl-1-methyl-2-indolylpropionic acid thioamide,
1-Methyl-3-phenyl-2-indolylacetamide,
1-Methyl-3-phenyl-2-indolylpropionamide.

The thus obtained indole-2-aliphatic acid amide or thioamide derivatives represented by the formula (IV) can be reduced easily to the 2-aminoalkyl indole derivatives of the formula (II).

That is, the reduction is carried out by, for example, electrolytic reduction, reduction with alkali metal in alcohols, catalytic reduction in the presence of a metal catalyst or reduction with a metal hydride complex. Particularly, however, reduction with a metal hydride complex, e.g., lithium aluminum hydride, is preferable.

The aminoalkyl compounds obtained according to the above process can be converted to corresponding salts by treatment with an acid, e.g., a mineral acid such as hydrochloric, hydrobromic, sulfuric, nitric or phosphoric acid, or an organic acid such as acetic acid or the like.

Route B

An indole-2-carboxamide derivatives represented by the formula (VIII) is prepared by reacting indole-2-carboxylic acid derivatives represented by the formula:

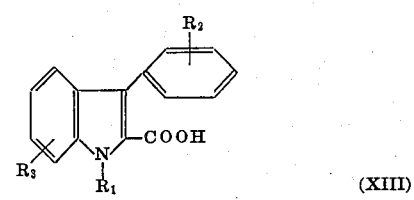

(XIII)

wherein $R_1$, $R_2$ and $R_3$ are as defined above, or reactive derivative thereof, with dialkylamine represented by the formula:

(XVII)

wherein $R_4$ and $R_5$ are as defined above: The reactive derivative referred to herein is an acid halide, an acid anhydride or an ester. Examples of acid halide are acid chloride and acid bromide, and examples of ester are, for example, methyl ester, ethyl ester, tertiary butyl ester, benzyl ester and p-nitrophenyl ester.

Acid anhydrides such as a mixed anhydride described in "Organic Reactions" Vol.12, p.157 (1962) can be used. The reaction is advantageously effected in a suitable solvent. Suitable solvents include methanol, ethanol, ether, acetone, benzene, toluene, xylene, chloroform and pyridine.

Further, by reduction of the indole-2-carboxamide or thioamide derivatives of the formula (VIII), 2-dialkyl-aminomethylindole derivatives of the formula (III):

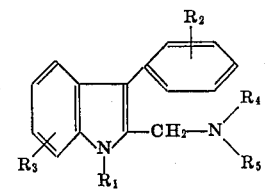

wherein $R_1$, $R_2$, $R_3$, $R_4$ and $R_5$ are as defined above can be readily prepared.

In practising this process, the reduction of the indole-2-carboxamide or thioamide derivative represented by the formula (VIII) is carried out according to usual method of reduction, such as electrolytic reduction, reduction by alkali metal in alcohols, catalytic reduction in the presence of a catalyst such as platinum, palladium, nickel catalyst and the like, or reduction with use of metal hydride complex compound. Particularly preferable reduction agents are a metal hydride complex, for example, lithium-aluminum hydride.

According to the above process, there are obtained, for example, the following 2-dialkylaminomethyl-indole derivatives and acid addition salts thereof:

2-(Dimethylaminomethyl)-3-phenylindole,
2-(Diethylaminomethyl)-3-phenylindole,
2-(Dimethylaminomethyl)-3-phenyl-5-chloroindole,
2-(Diethylaminomethyl)-3-phenyl-5-chloroindole,
2-(Dimethylaminomethyl)-3-phenyl-6 (or 4)-chloroindole,
2-(Dimethylaminomethyl)-3-phenyl-7-chloroindole,
2-(Dimethylaminomethyl)-3-phenyl-5-fluoroindole,
2-(Dimethylaminomethyl)-3-(o-chlorophenyl)-5-chloroindole,
2-(Dimethylaminomethyl)-3-(o-bromophenyl)-5-chloroindole,
2-(Dimethylaminomethyl)-3-(o-fluorophenyl)-5-chloroindole,
2-(Dimethylaminomethyl)-3-(m-chlorophenyl)-5-chloroindole,
2-(Dimethylaminomethyl)-3-(p-chlorophenyl)-5-chloroindole,
1-Methyl-2-(dimethylaminomethyl)-3-phenyl-indole,
1-Methyl-2-(dimethylaminomethyl)-3-phenyl-5-chloroindole,
1-Methyl-2-(diethylaminomethyl)-3-phenyl-5-chloroindole,
1-Ethyl-2-(dimethylaminomethyl)-3-phenyl-5-chloroindole,
1-Methyl-2-(dimethylaminomethyl)-3-phenyl-5-bromo-indole,
1-Methyl-2-(dimethylaminomethyl)-3-(o-chlorophenyl)-5-chloro-indole,
1-Methyl-2-(dimethylaminomethyl)-3-(p-chlorophenyl)-5-chloro-indole,
1-Methyl-2-(dimethylaminomethyl)-3-(o-fluorophenyl)-5-chloro-indole.

The quaternary ammonium salts represented by the formula (VII) are easily prepared by reacting the 2-dialkyl aminomethylindole derivatives with alkyl halides represented by the formula $R^6$-X, wherein $R^6$ and X are as defined above. The alkyl halide includes, for example, methyl chloride, methyl bromide, methyl iodide, ethyl iodide, allyl chloride, allyl bromide, methallyl chloride.

The above process is effected by reacting the 2-dialkyl aminomethylindole derivatives represented by the formula (III) with the alkylhalides of the formula $R^6$-X. The reaction may be carried out in such solvents as, for example, toluene, benzene, ethyl acetate, acetone, acetonitrile, ether and alcohol, or in other inert solvents. Alternatively, the reaction may be effected by heating the reactants together without using solvents.

The thus obtained derivatives of trialkylammonium salts of the formula (VII) are reacted with metal cyanides, whereby the cyanomethylindole derivatives of the formula (VI) can be obtained.

The above-mentioned process is carried out by reacting the derivatives of quaternary ammonium salts represented by the formula (VII) with metal cyanides such as sodium, potassium and copper cyanides. The reaction is effected pereferably in the presence of solvents. Suitable solvents include, for example, lower alcohols such as methanol and ethanol, dioxane, pyridine, dimethyl-sulfoxide, tetrahydrofuran or the like.

According to the above-mentioned process, there are obtained, for example, following cyanomethylindole derivatives represented by the formula (VI):

3-Phenylindole-2-acetonitrile,
5-Chloro-3-phenylindole-2-acetonitrile,
6(or 4)-Chloro-3-phenylindole-2-acetonitrile,
7-Chloro-3-phenylindole-2-acetonitrile,
5-Bromo-3-phenylindole-2-acetonitrile,
5-Fluoro-3-phenylindole-2-acetonitrile,
5-Chloro-3-(o-chlorophenyl)-indole-2-acetonitrile,
5-Chloro-3-(o-bromophenyl)-indole-2-acetonitrile,
5-chloro-3-(o-fluorophenyl)-indole-2-acetonitrile,
5-Chloro-3-(m-chlorophenyl)-indole-2-acetonitrile,
5-Chloro-3-(p-chlorophenyl)-indole-2-acetonitrile,
5-Chloro-1-methyl-3-phenylindole-2-acetonitrile,
5-Chloro-1-ethyl-3-phenylindole-2-acetonitrile,
1-Methyl-3-phenyl-indole-2-acetonitrile,
5-Chloro-3-(o-chlorophenyl)-1-methyl-indole-2-acetonitrile,
5-Chloro-3-(p-chlorophenyl)-1-methyl-indole-2-acetonitrile,
5-Chloro-3-(o-fluorophenyl)-1-methyl-indole-2-acetonitrile,
5-Bromo-1-methyl-3-phenyl-indole-2-acetonitrile.

When the thus obtained cyanomethylindole of the formula (VI) are reduced, the 2-aminoethylindole derivatives represented by the formula (II) can be easily obtained as starting materials for the benzodiazocine derivatives of the present invention.

For the production of the 2-aminoalkylindole derivatives represented by the formula (II), the cyanomethylindole derivatives of the formula (VI) are ordinarily subjected to a known process for the reduction of nitriles to amines. That is, reduction of the said carbonitrile derivatives is carried out according to, for example, electrolytic reduction, reduction with alkali metals in alcohols, catalytic reduction using palladium-, nickel- or platinum-system catalysts, reduction using chromous acetatealkali, or reduction using metal hydride complexes which include lithium aluminium hydride, boron hydride and their mixture with an acid such as aluminium chloride, ferric chloride, boron trifluoride, hydrochloric acid or the like. Particularly, the reduction using lithium aluminium hydride, or the mixture of, for example, lithium aluminium hydride and aluminium chloride, sodium borohydride and aluminium chloride, sodium borohydride and boron trifluoride or the like is preferable in that the operation is simple and the selectivity is favorable.

Route C

Starting materials in the Route C are the indole-2-carboxylic acids represented by the formula (XIII) or reactive derivatives thereof. The indole-2-carboxylic acid derivatives of the formula (XIII) or reactive derivatives thereof are reduced to give the corresponding indole-2-methanol derivatives of the formula (XII).

The reactive derivatives include esters, acid halides and acid anhydrides. The esters include, for example, methyl, ethyl, and tertiary butyl esters, and the acid halides include, for example, acid chlorides.

The reduction of the said compounds is carried out according to, for example, reduction with alkali metals, catalytic reduction with nickel, copper, chromium or copper oxide as a catalyst, or reduction with metal hydride complexes. Particularly, the reduction with metal hydride complexes, e.g., lithium-aluminum hydride, sodium boron hydride and the like, is preferable from the viewpoints of yield, selectivity and simplicity.

According to the above process, there are obtained, for example, the following indole-2-methanol derivatives represented by the formula (XII):

3-Phenylindole-2-methanol,
5-Chloro-3-phenylindole-2-methanol,
5-Bromo-3-phenylindole-2-methanol,
5-Fluoro-3-phenylindole-2-methanol,
5(or 4)-Chloro-3-phenylindole-2-methanol,
7-Chloro-3-phenylindole-2-methanol,
3-(o-Chlorophenyl)-5-chloroindole-2-methanol,
5-Chloro-3-(o-fluorophenyl)-indole-2-methanol,
5-Chloro-1-methyl-3-phenylindole-2-methanol,
5-Chloro-1-ethyl-3-phenylindole-2-methanol,
5-Chloro-1-methyl-3-(o-fluorophenyl)-indole,
1-Methyl-3-phenylindole-2-methanol,
1Methyl-3-(o-fluorophenyl)-indole-2-methanol,
5-Bromo-1-methyl-3-phenylindole-2-methanol.

By oxidation of the thus obtained indole-2-methanol derivatives of the formula (XII), the indole-2-aldehyde derivatives represented by the formula (X) can be easily prepared.

In practicing the above process, the indole-2-methanol derivatives represented by the formula (XII) are subjected to an ordinary process for oxidizing primary alcohols to aldehydes, e.g., an oxidation process using chromic acid, manganese dioxide, selenium dioxide, nitric acid, nitrogen dioxide or permanganate. The reaction is ordinarily effected in a solvent, which may be suitably selected from the group consisting of benzene, ether, tetrahydrofuran, petroleum ether, acetone, chloroform, acetic acid, water, sulfuric acid and other solvents.

According to the above process, there are obtained, for example, the following indole-2-aldehyde derivatives represented by the formula (X):

3-Phenylindole-2-aldehyde,
3-Phenyl-5-chloroindole-2-aldehyde,
3-Phenyl-5-bromoindole-2-aldehyde,
3-Phenyl-5-fluoroindole-2-aldehyde,
3-Phenyl-6 (or 4)-chloroindole-2-aldehyde,
3-Phenyl-7-chloroindole-2-aldehyde,
3-(o-Chlorophenyl)-indole-2-aldehyde,
3-(o-Chlorophenyl)-5-chloroindole-2-aldehyde,
3-(o-Bromophenyl)-5-chloroindole-2-aldehyde,
3-(o-Fluorophenyl)-5-chloroindole-2-aldehyde,
3-(m-Chlorophenyl)-5-chloroindole-2-aldehyde,
3-(p-Chlorophenyl)-5-chloroindole-2-aldehyde,
3-(p-Chlorophenyl)-5-chloroindole-2-aldehyde,
1-Methyl-3-phenylindole-2-aldehyde,
1-Methyl-3-phenyl-5-chloroindole-2-aldehyde,
1-Methyl-3-phenyl-5-bromoindole-2-aldehyde,
1-Methyl-3-(o-fluorophenyl)-5-chloroindole-2-aldehyde,
1-Ethyl-3-phenyl-5-chloroindole-2-aldehyde.

For the production of the 2-(nitroalkenyl)-indole derivatives represented by the formula (IX), the indole-2-aldehyde derivatives of the formula (X) are condensed with nitromethane, preferably in the presence of a basic catalyst.

The basic catalyst includes, for example, amines such as ethylamine, n-butylamine, amylamine, cyclohexylamine and aniline; organic bases such as ammonium acetate and Triton B (trade name for a surface active agent produced by Rohm & Haas Co.); caustic alkalis such as caustic soda and caustic potash; and sodium alcoholates. In case the caustic alkali or sodium alcoholate is used as the catalyst, the reaction mixture is treated with acid after completion of the reaction.

According to the above process, it is possible to prepare, for example, the following nitroalkenylindole derivatives represented by the formula (IX):

2-(2'-Nitrovinyl)-3-phenylindole,
2-(2'-Nitrovinyl)-3-phenyl-5-chloroindole,
2-(2'-Nitrovinyl)-3-phenyl-5-bromoindole,
2-(2'-Nitrovinyl)-3-phenyl-5-fluoroindole,
2-(2'-Nitrovinyl)-3-phenyl-6 (or 4)-chloroindole,
2-(2'-Nitrovinyl)-3-phenyl-7-chloroindole,
2-(2'-Nitrovinyl)-3-(o-chlorophenyl)-5-chloroindole,
2-(2'-Nitrovinyl)-3-(m-chlorophenyl)-5-chloroindole,
2-(2'-Nitrovinyl)-3-(p-chlorophenyl)-5-chloroindole,
2-(2'-Nitrovinyl)-3-(p-bromophenyl)-5-chloroindole,
2-(2'-Nitrovinyl)-3-(o-fluorophenyl)-5-chloroindole,
1-Methyl-2-(2'-nitrovinyl)-3-phenylindole,
1-Methyl-2-(2'-nitrovinyl)-3-phenyl-5-bromoindole,
1-Methyl-2-(2'-nitrovinyl)-3-(o-chlorophenyl)-5-chloro-indole,
1-Methyl-2-(2'-nitrovinyl)-3-(o-fluorophenyl)-5-chloro-indole,
1-Methyl-2-(2'-nitrovinyl)-3-phenyl-5-chloroindole,
1-Ethyl-2-(2'-nitrovinyl)-3-phenyl-5-chloroindole.

The thus obtained 2-nitroalkenylindole derivatives of the formula (IX) are reduced, whereby 2-aminoalkylindole derivatives of the formula (II) can be readily prepared.

In practicing the above process, the 2-nitroalkenylindole derivatives of the formula (IX) are subjected to an ordinary process for the reduction of nitrovinyl groups to aminoethyl groups. That is, the reduction of the said derivatives is carried out according to, for example, electrolytic reduction, catalytic reduction in the presence of a metal catalyst, or reduction with a metal hydride complex. Particularly, the reduction with a metal hydride complex, e.g., lithium-aluminum hydride, is preferable from the stand-points of yield and simplicity.

The 2-aminoalkylindole derivatives of the formula (II) may be obtained as acid salts by treating it with acids, e.g., mineral acids such as hydrochloric, hydrobromic, sulfuric, nitric and phosphoric acids, or organic acids such as acetic, formic, maleic, fumaric and succinic acids.

According to the above Routes [A], [B] and [C], there are obtained, for example, the following 2-aminoalkyl-indole derivatives of the formula (II).

2-(2'-Aminoethyl)-3-phenylindole, 2-(2'-Aminoethyl)-3-phenyl-5-chloroindole,
2-(2'-Aminoethyl)-3-phenyl-6 (or 4)-chloroindole,
2-(2'-Aminoethyl)-3-phenyl-7-chloroindole,
2-(2'-Aminoethyl)-3-phenyl-5-bromoindole,
2-(2'-Aminoethyl)-3-(o-chlorophenyl)-indole,
2-(2'-Aminoethyl)-3-(o-chlorophenyl)-5-chloroindole,
2-(2'-Aminoethyl)-3-(o-fluorophenyl)-5-chloroindole,
2-(2'-Aminoethyl)-3-(p-chlorophenyl)-5-chloroindole,
2-(2'-Aminoethyl)-3-(p-bromophenyl)-5-chloroindole,
2-(2'-Aminopropyl)-3-phenylindole,
2-(3'-Aminopropyl)-3-phenyl-5-chloroindole,
2-(3'-Aminopropyl)-3-phenyl-5-bromoindole,
2-(3'-Aminopropyl)-3-phenyl-6 (or 4)-chloroindole,
2-(3'-Aminopropyl)-3-phenyl-7-chloroindole,
2-(3'-Aminopropyl)-1-methyl-3-phenyl-5-chloroindole,
2-(3'-Aminopropyl)-3-(o-chlorophenyl)-5-chloroindole,
2-(3'-Aminopropyl)-3-(o-fluorophenyl)-5-chloroindole,
2-(3'-Aminopropyl)-3-(m-chlorophenyl)-5-chloroindole,
2-(3'-Aminopropyl)-3-(p-chlorophenyl)-5-chloroindole,
2-(2'-Aminoethyl)-1-methyl-3-phenyl-indole,
2-(2'-Aminoethyl)-5-chloro-1-methyl-3-phenyl-indole,
2-(2'-Aminoethyl)-3-(o-chlorophenyl)-1-methyl-indole,
2-(2'-Aminoethyl)-5-chloro-3-(o-fluorophenyl)-1-methyl-indole,
2-(2'-Aminoethyl)-5-bromo-1-methyl-3-phenylindole,
2-(2'-aminoethyl)-5-chloro-3-(p-chlorophenyl)-1-methyl-indole,
2-(2'-Aminoethyl)-5-chloro-1-ethyl-3-phenyl-indole,
2-(3'-Aminopropyl)-1-methyl-3-phenyl-indole,
2-(3'-Aminopropyl)-5-chloro-1-methyl-3-phenyl-indole,
2-(3'-Aminopropyl)-5-bromo-1-methyl-3-phenyl-indole,
2-(3'-Aminopropyl)-5-chloro-1-ethyl-3-phenyl-indole,
3-(3'-Aminopropyl)-5-chloro-3-(o-chlorophenyl)-1-methyl-indole,
3-(3'-Aminopropyl)-5-chloro-3-(o-fluorophenyl)-1-methyl-indole,
3-(3'-Aminopropyl)-5-chloro-3-(p-chlorophenyl)-1-methyl-indole,
and the hydrochloride, hydrobromide and sulfate thereof.

The indole-2-aldehyde derivatives of the formula (X) can also be prepared from indole-2-carboxylic acid derivatives of the formula (XIII), via 1-indolyl-carbonyl-2-p-tolylsulfonylhydrazine derivatives of the formula (XIV).

An indole-2-carboxylic acid derivative of the formula (XIII) or its reactive derivative is treated with hydrazine to give an indole-2-carboxylic acid hydrazide derivative of the formula (XV).

The reactive derivative referred to herein is an acid chloride, an acid anhydride or an ester. The esters include, for example, methyl, ethyl, tertiary butyl, benzyl and p-nitrophenyl esters, and the acid halides include acid chlorides and acid bromides.

The hydrazide derivatives according to the above process are obtained by reacting the esters or halides of the said indole-2-carboxylic acid derivatives of the formula (XIII) with hydrazine. The reaction does not necessarily require the presence of solvent, but is advantageously effected in the presence of an excess amount of hydrazine hydrate, or methanol, ethanol, benzene or toluene.

According to the above process, there are obtained, for example, the following novel indole-2-carboxylic acid hydrazide derivatives of the formula (XV):
3-Phenylindole-2-carboxylic acid hydrazide,
5-Chloro-3-phenylindole-2-carboxylic acid hydrazide,
5-Bromo-3-phenylindole-2-carboxylic acid hydrazide,
5-Fluoro-3-phenylindole-2-carboxylic acid hydrazide,
6 (or 4)-Chloro-3-phenylindole-2-carboxylic acid hydrazide,
7-Chloro-3-phenylindole-2-carboxylic acid hydrazide,
3-(o-Chlorophenyl)-5-chloroindole-2-carboxylic acid hydrazide,
5-Chloro-3-(o-fluorophenyl)-indole-2-carboxylic acid hydrazide,
5-Chloro-1-methyl-3-phenylindole-2-carboxylic acid hydrazide,
5-Chloro-1-ethyl-3-phenylindole-2-carboxylic acid hydrazide,
5-Bromo-1-methyl-3-phenylindole-2-carboxylic acid hydrazide,
1-Methyl-3-phenyl-indole-2-carboxylic acid hydrazide,
5-Chloro-3-(o-chlorophenyl)-1-methyl-indole-2-carboxylic acid hydrazide,
5-Chloro-3-(p-chlorophenyl)-1-methyl-indole-2-carboxylic acid hydrazide,
5-Chloro-3-(o-fluorophenyl)-1-methyl-indole-2-carboxylic acid hydrazide.

The indole-2-carboxylic acid hydrazide of the formula (XV), prepared as described above is next converted to a 1-indolylcarbonyl-2-p-toluenesulfonylhydrazide derivative (XIV). This is accomplished by treating an indole-2-carboxylic acid hydrazide (XV) with p-toluenesulfonyl chloride. The reaction is preferably carried out in the presence of a basic agent such as pyridine, triethylamine or the like. The reaction is generally readily effected at room temperature. Higher or lower temperature sometimes found more satisfactory.

The 1-indolylcarbonyl-2-p-tolylsulfonyl hydrazine derivatives of the formula (XIV) prepared above can be converted to an indole-2-aldehyde derivative of the formula (X). Conversion into the aldehyde is effected by heating a 1-indolylcarbonyl-2-p-tolylsulfonyl hydrazine derivative in the presence of a base agent. Suitable basic agent include anhydrous sodium and potassium carbonate. Preferably, the reaction is carried out at temperatures within the range of about 140°–200

L C. The reaction is carried out advantageously in the presence of an inert solvent. Suitable inert solvents include ethylene glycol and glycerine. The aldehyde is isolated from the reaction mixture by extraction with a suitable solvent.

According to the above process, there are obtained, for example, the following indole-2-aldehyde derivatives represented by the formula (X):

3-Phenylindole-2-aldehyde,
3-Phenyl-5-chloroindole-2-aldehyde,
3-Phenyl-5-bromoindole-2-aldehyde,
3-Phenyl-5-fluoroindole-2-aldehyde,
3-Phenyl-6 (or 4)-chloroindole-2-aldehyde,
3-Phenyl-7-chloroindole-2-aldehyde,
3-(o-Chlorophenyl)-indole-2-aldehyde,
3-(o-Chlorophenyl)-5-chloroindole-2-aldehyde,
3-(o-Bromophenyl)-5-chloroindole-2-aldehyde,
3-(o-Fluorophenyl)-5-chloroindole-2-aldehyde,
3-(m-Chlorophenyl)-5-chloroindole-2-aldehyde,
3-(p-Chlorophenyl)-5-chloroindole-2-aldehyde,
3-(p-Chlorophenyl)-5-chloroindole-2-aldehyde,
1-Methyl-3-phenylindole-2-aldehyde,
1-Methyl-3-phenyl-5-chloroindole-2-aldehyde,
1-Methyl-3-phenyl-5-bromoindole-2-aldehyde,
1-Methyl-3-(o-fluorophenyl)-5-chloroindole-2-aldehyde,
1-Ethyl-3-phenyl-5-chloroindole-2-aldehyde.

The present invention is illustrated more particularly by the following examples. However, it is not necessary to say that the present invention is not limitted by the examples.

EXAMPLE 1

3-Phenyl-5-chloro-2-indolylpropionic acid amide

A solution of 13.1 g. of 3-phenyl-5-chloro-2-indolylpropionic acid in 160 ml. of anhydrous tetrahydrofuran and 4.41 g. of triethylamine is added dropwise at 0° C. to a solution of 4.75 g. of ethyl chloroformate in 150 ml. of anhydrous tetrahydrofuran over a period of 30 minutes. The mixture is stirred at 0° C. for 1 hour, and then gaseous ammonia is bubbled into the mixture for 15 minutes, whereby the temperature was elevated to 15° C. The reaction mixture is stirred at 0° C. for 30 minutes and then at room temperature for additional 2 hours.

Thereafter, tetrahydrofuran is removed under reduced pressure, and the residue is extracted with benzene. The extract is washed with an aqueous hydrochloric acid solution, an aqueous sodium carbonate solution and an aqueous saturated sodium chloride solution, and is dried over sodium sulfate. The benzene is removed under reduced pressure to a solid. The solid s recrystallized from 60 ml. of benzene to give 9 g. of 5-chloro-3-phenyl-indolylpropionamide as white crystals, m.p. 119°–120° C. From the filtrate, 1.2 g. of the second crop is obtained.

The 3-phenyl-5-chloro-2-indolylpropionic acid as starting material in this example is obtained as follows:

To a mixture of 7.1 g. of p-chlorophenylhydrazine in 15 ml. of acetic acid and 25 ml. of water is added 11 g. of ethyl-ω-phenyllevulinate.

The reaction mixture is stirred at 20° C. for 10 minutes. To the reaction mixture is added 50 ml. of water and 50 ml. of ether.

The resulting crystals are collected by filtration and washed with ether to give 6 g. of ethyl-ω-phenyl-levulinate p-chlorophenylhydrazone.

From the ether layer of the filtrate 6.2 g. of the second crop is obtained. These crystals are recrystallized from benzene to give white needles having the melting point of 140°–141° C.

To a solution of 30 ml. of 35 percent ethanolic hydrogen chloride is added 4.1 g. of ethyl-ω-phenyl-levulinate-p-chlorophenylhydrazone.

The mixture is stirred at 70°–75° C. for 1 hour, and then the solvent is removed.

The residue is extracted with benzene and the benzene layer is washed with water and dried over sodium sulfate.

The benzene is removed under reduced pressure to give 3.9 g. of a solidal substance, which is recrystallized from cyclohexane to give 3.1 g. of ethyl-3-phenyl-5-chloro-indole-2-propionate, m.p. 94°–95° C.

A mixture of 21 g. of ethyl-3-phenyl-5-chloro-indole-2-propionate, 7.2 g. of potassium hydroxide and 200 ml. of ethanol is heated under reflux for 2 hours. After the solvent is removed, the residue is dissolved in 100 ml. of water, and the water solution is washed twice with ether, acidified with hydrochloric acid under cooling, and extracted with ether.

The ether extract is washed with water and dried over sodium sulfate and the solvent is removed to give 17 g. of 3-phenyl-5-chloro-indole-2-propionic acid. Recrystallization from benzene gives the product having m.p. 162°–163° C.

EXAMPLE 2

Using the procedure similar to that described in Example 1 but replacing 3-phenyl-5-chloro-2-indolylpropionic acid by 1-methyl-3-phenyl-5-chloro-2-indolylpropionic acid, there is obtained 5-chloro-1-methyl-3-phenyl-2-indolyl-propionamide, which is recrystallized from benzene, m.p. 189°–190° C.

The 1-methyl-3-phenyl-5-chloro-2-indolylpropionic acid as starting material in this example is obtained as follows:

To a mixture of 4.5 g. of sodium hydride (50 percent in oil) and 120 ml. of N,N-dimethylformamide is added 23 g. of ethyl-3-phenyl-5-chloro-indole-2-propionate under cooling with ice and the ice cooled mixture is stirred for 1 hour. To the mixture is added dropwise 15 g. of methyliodide and the mixture is stirred for 1 hour at room temperature. The mixture is added to water and extracted with the ether. The etheral extract is washed with water and dried over sodium sulfate and the solvent is distilled off to give 22 g. of ethyl-1-methyl-3-phenyl-5-chloro-indole-2-propionate.

This ethyl 1-methyl-3-phenyl-5-chloropropionate is converted to 1-methyl-3-phenyl-5-chloro-propionic acid by the procedure similar to that in Example 1. Recrystallization from benzene gives the product having m.p. 193°–194° C.

EXAMPLE 3

2-(3'-Aminopropyl)-3-phenyl-5-chloroindole hydrochloride

To a suspension of 2.2 g. of lithium-aluminum hydride in 350 ml. of dry ether is added portionwise 5 g. of β-(3-phenyl-5-chloro-2-indolyl) propionamide at room temperature.

After stirring under reflux for 4 hours, the reaction mixture is ice-cooled and is decomposed by careful addition of water. The ether layer is separated by decantation, and the residue is extracted with 100 ml. of ether. The ether layers are combined and washed with 40 ml. of water. The ether solution is cooled with ice, and treated with 20 ml. of 6N-hydrochloric acid, and the mixture is stirred, whereby crystals are deposited. The deposited crystals are collected by filtration, washed with water, followed by ether and dried to give 3.7 g. of a white solid.

The solid is recrystallized from ethanol to give 2-(3'-aminopropyl)-3-phenyl-5-chloroindole hydrochloride, m.p. 264°–265° C.

EXAMPLE 4

Using the procedure similar to that in Example 3, but replacing 3-phenyl-5-chloro-2-indolylpropionamide by 1-methyl-3-phenyl-5-chloro-indolylpropionamide, there is obtained 1-methyl-2-(3'-aminopropyl)-3-phenyl-5-chloro-indole hydrochloride, which is recrystalized from ethanol to give crystals having the melting point of 287°–288° C.

EXAMPLE 5

3-Phenyl-5-chloro-2-indolyl-N,N-dimethylcarboxamide

To a suspension of 11 g. of 3-phenyl-5-chloro-indole-2-carboxylic acid in 100 ml. of benzene is added 20 ml. of thionyl chloride. The reaction mixture is refluxed for 2 hours. The solvent and excess thionyl chloride are removed under reduced pressure to give a yellow solid.

To the solid is added a solution of 20 g. of dimethylamine in 200 ml. of benzene at 15°–20° C. After the reaction mixture is stirred at 20° for 30 minutes, the organic layer is washed with water, aqueous sodium carbonate and water successively, and is dried over sodium sulfate. The solvent is removed to give 11.6 g. of solidal product, which is recrystallized from ethanol to give 3-phenyl-5-chloro-2-indolyl-N,N-dimethylcarboxamide, m.p. 225°–226° C.

The 3-phenyl-5-chloro-indole-2-carboxylic acid as starting material in this Example is obtained as follows:

A mixture of 131 g. of p-chloroaniline, 255 ml. of conc. hydrochloric acid and 250 ml. of water is heated, and then cooled below 0° C. To the mixture is added thereto, dropwise 222 g. of a 32.3 percent aqueous solution of sodium nitrite at a temperature below 10° C. with stirring, and then 115 g. of sodium acetate. The resultant mixture is added, portionwise, to a chilled mixture of 220 g. of ethyl α-benzylacetoacetate, 1,000 ml. of methanol and 200 g. of anhydrous potassium acetate at a temperature below 10° C. with stirring.

After addition, the reaction mixture is stirred for 2 hours at a temperature below 10° C. The precipitate is collected by filtration, washed with water thoroughly, washed with methanol and dried to give 343 g. ethyl α-benzyl-α-(p-chloro-phenyl-azo) acetoacetate. Recrystallization from ethanol give pure product having a melting point of 61°–62.5° C.

To a suspension of 180 g. of ethyl α-benzyl-α-(p-chloro-phenyl-azo) acetoacetate in 500 ml. of isopropanol is added dropwise 50 ml. of concentrated sulfuric acid. The mixture is heated under refluxing for 2.5 hours, and then cooled. The precipitate is collected by filteration, washed with isopropanol, and enough water, and dried to yield 114 g. of ethyl 5-chloro-3-phenyl-indole-2-carboxylate. Recrystallization from ethanol gives pure product having m.p. 178°–180° C. Melting point 172°–172.5° C.

A mixture of 82 g. of ethyl 5-chloro-3-phenyl-indole-2-carboxylate and 1.2 l of a 2.7 percent potassium hydroxide ethanol solution is heated under refluxing for 2 hours. The ethanol is removed by distillation and the residue is dissolved in 300 ml. of water. The solution is made acidic with conc. hydrochloric acid under cooling. The precipitate formed is collected by filtration, washed thoroughly with water and dried to give 72 g. of 5-chloro-3-phenyl-indole-2-carboxylic acid having melting point of 227°–228° C.

Recrystallization from benzene raises the melting point to 231° C.

EXAMPLE 6

1-Methyl-3-phenyl-5-chloro-2-indolyl-N,N-dimethyl-carboxamide

Using the procedure similar to that described in Example 5 but replacing 3-phenyl-5-chloro-indole-2-carboxylic acid by 1-methyl-3-phenyl-5-chloro-indole-2-carboxylic acid there is obtained 1-methyl-3-phenyl-5-chloro-2-indolyl-N,N-dimethylcarboxamide.

The 1-methyl-3-phenyl-5-chloro-indole-2-carboxylic acid as starting materials in this Example is obtained as follows:

A mixture of 50.0 g. (0.167 ml.) of ethyl-3-phenyl-5-chloro-indole-2-carboxylate, 334 ml. of acetone and 33.4 ml. of a 66 percent aqueous potassium hydroxide solution is heated under refluxing. To the solution, is added dropwise 44.6 g. of dimethyl sulfate with stirring and is then heated under refluxing. After completion of the reaction, the solvent is removed by distillation under reduced pressure, and the residue is washed with water and extracted with benzene. The benzene layer is washed with water, dried over sodium sulfate and then the solvent is removed by distillation under reduced pressure to obtain 52.3 g. of orange red oily residue.

The oily residue is dissolved in 50 ml. of hot ethanol and then cooled. The precipitate is collected by filtration to give 46.2 g. (88.3 percent) of needles of ethyl 1-methyl-3-phenyl-5-chloro-2-carboxylate, m.p. 88°–89° C.

A mixture of 46.2 g. of ethyl 1-methyl-3-phenyl-5-chloro-indole-2-carboxylate and 460 cc. of ethanol containing 17.0 g. of potassium hydroxide, is heated under refluxing for 2 hours. The ethanol is removed by distillation under reduced pressure, and the residue is dissolved in 120 cc. of hot water. The solution is cooled to 10° C., and 25 cc. of conc. hydrochloric acid is added dropwise to from a precipitate. The precipitate is filtered (at 15° C.), washed with water and dried to give quantitatively 42.2 g. of 1-methyl-3-phenyl-5-chloro-indole-2-carboxylic acid, m.p. 201°–205° C.

2 g. of the obtained 1-methyl-3-phenyl-5-chloro-indole-2-carboxylic acid is recrystallized from 170 cc. of benzene to give 1.9 g. of the product having m.p. 211°–213° C.

EXAMPLE 7

2-(Dimethylaminomethyl)-3-phenyl-5-chloroindole

To a suspension of 10 g. of lithium-aluminum hydride in 100 ml. of anhydrous tetrahydrofuran is added a solution of 8.4 g. of 3-phenyl-5-chloroindole-2-(N,N-dimethyl) carboxylic acid amide in 100 ml. of anhydrous tetrahydrofuran at room temperature, and the mixture is stirred at 25° C. for 5 hours. The reaction mixture is decomposed by addition of water. The tetrahydrofuran layer is separated by decantation and concentrated under reduced pressure. The residue is extracted with ether. The ether layer is washed with water and dried, and the solvent is removed under reduced pressure to give 8 g. of 2-(dimethylaminomethyl)-3-phenyl-5-chloroindole as a viscous oil.

This product is confirmed in the following manner:

The crude 2-(dimethylaminomethyl)-3-phenyl-5-chloroindole is dissolved in 50 ml. of ethyl acetate. To this solution is added dropwise, a solution of 4.5 g. of methyl iodide in 20 ml. of ethyl acetate with ice-cooling and stirring, and the mixture is stirred at 50° C. for 1 hour. Thereafter, the solvent is removed under reduced pressure to give 12 g. of a yellowish white solid. The residual solid is recrystallized from ethanol to give 9.7 g. of 2-(dimethylaminomethyl)-3-phenyl-5-chloroindole methiodide as white crystals, m.p. 145°–147° C.

EXAMPLE 8

1-Methyl-2-(dimethylaminomethyl)-3-phenyl-5-chloroindole

Using the procedure similar to that in Example 7, but replacing 3-phenyl-5-chloro-2-indolyl-N,N-dimethylcarboxamide by 1-methyl-3-phenyl-5-chloro-2-indolyl-N,N-dimethylcarboxamide, there is obtained 1-methyl-2-(dimethylaminomethyl)-3-phenyl-5-chloro-indole as an oil.

EXAMPLE 9

2-(Dimethylaminomethyl)-3-phenyl-5-chloroindole methiodide

A solution of 4.3 g. of methyl iodide in 20 ml. of ethyl acetate is added dropwise to a solution of 8 g. of 2-(dimethylaminomethyl)-3-phenyl-5-chloroindole in 50 ml. of ethyl acetate with ice-cooling and stirring. The mixture is stirred at 50° C. for 1 hour. Subsequently, the solvent is removed under reduced pressure to give 12 g. of a yellowish white solid. The solid is recrystallized from ethanol to give 9.7 g. of 2-(dimethylaminomethyl)-3-phenyl-5-chloroindole methiodide as white crystals, m.p. 145°–147° C.

When 1-methyl-2-(dimethylaminomethyl)-3-phenyl-5-chloro-indole is used in place of 2-(dimethylaminomethyl)-3-phenyl-5-chloro-indole, there is obtained 1-methyl-2-(dimethylaminomethyl)-3-phenyl-5-chloro-indole methiodide.

EXAMPLE 10

3-Phenyl-5-chloroindole-2-acetonitrile

A mixture of 4.26 g. of 3-phenyl-5-chloro-2-(N,N-dimethylaminomethyl)-indole methiodide and 2 g. of potassium cyanide and 100 ml. of methanol is stirred under reflux for 16 hours.

After removing methanol under reduced pressure, the residue is treated with water and extracted with ether. The ether extract is washed with water, dried over sodium sulfate, and the solvent is removed. The residue is chromatographed on a 100 – 200 mesh silica gel using benzene as an eluent to give 0.9 g. of crystals, which is recrystallized from a benzene-hexane to give 3-phenyl-5-chloroindole-2-acetonitrile as white needles, m.p. 178.5°–179° C.

When 1-methyl-3-phenyl-5-chloro-2-(dimethylamino-methyl)-indole methiodide is used in place of 3-phenyl-5-chloro-2-(dimethylaminomethyl)-indole methiodide, there is obtained 1-methyl-3-phenyl-5-chloroindole-2-acetonitrile.

EXAMPLE 11

5-Chloro-3-phenylindole-2-methanol

A suspension of 6 g. of ethyl 5-chloro-3-phenylindole-2-carboxylate in 50 ml. of anhydrous ether is added dropwise to a suspension of 1.5 g. of lithium-aluminum hydride in 70 ml. of anhydrous ether with stirring at room temperature, and the mixture is stirred under reflux for 2 hours.

After cooling with ice, the reaction mixture is decomposed by careful addition of 1 N-hydrochloric acid, and extracted with ether. The extract is washed with an aqueous sodium bicarbonate solution and water, and dried over sodium sulfate. The ether solution is concentrated to dryness to give 5.1 g. of white solid, which is recrystallized from ether to give white granular crystals, m.p. 116°–117° C.

EXAMPLE 12

5-Chloro-1-methyl-3-phenyl-indole-2-methanol

Using the procedure similar to that described in Example 11, but replacing ethyl 5-chloro-3-phenylindole-2-carboxylate by ethyl 5-chloro-1-methyl-3-phenylindole-2-carboxylate, there is obtained 5-chloro-1-methyl-3-phenyl-indole-2-methanol, which is recrystallized from benzene to give colorless needles, m.p. 140°–141° C.

The ethyl 5-chloro-1-methyl-3-phenyl-indole-2-carboxylate as starting material in this Example is obtained by the same method described in Example 6.

EXAMPLE 13

5-Chloro-3-(o-fluorophenyl)-1-methyl-indole-2-methanol

Using the similar to that described in Example 11, but replacing ethyl 5-chloro-3-phenyl-indole-2-carboxylate by ethyl 5-chloro-3-(o-fluorophenyl)-1-methyl-indole-2-carboxylate, there is obtained 5-chloro-3-(o-fluorophenyl)-1-methyl-indole-2-methanol.

The ethyl 5-chloro-3-(o-fluorophenyl)-1-methyl-indole-2-carboxylate as starting material in this Example is obtained as follows:

To a solution of 150 ml. of ethyl acetoacetate in 400 ml. of dry benzene, is added 33 g. of calcium oxide in small portions. The mixture is heated under reflux condition for several hours. After cooling, a deposited solid is collected by filtration, washed with benzene and dried to give ethyl calcioacetoacetate, m.p. 220°–221° C.

A mixture of 87 g. of o-fluorobenzyl bromide, 137 g. of ethyl calcioacetoacetate and 300 ml. of dimethylformamide is heated at 75° C. for 6 hours. After completion of the reaction, the solvent is removed by distillation under reduced pressure, and 150 ml. of ethanolic hydrogen chloride is added to the residue. The mixture is stirred at room temperature to decompose the unreacted salt. The solvent is removed by distillation under reduced pressure, and 200 ml. of water is added to the residue. The separated yellow oily product is extracted with ether, and the organic layer is washed with water, dried over sodium sulfate and concentrated, and the residue is distilled under reduced pressure to give 99.4 g. (90.8 percent) of ethyl o-fluorobenzyl acetoacetate, b.p. 164°–167° C./23 mmHg. Infrared absorption spectrum, $\nu_{max}^{Paraffin}$: 1,740, 1,720, 1,496 1,495 cm$^{-1}$.

To an ice-cold solution of 99.4 g. of ethyl o-fluorobenzylacetoacetate in 420 ml. of ethanol is added dropwise 150 ml. of 50 percent aqueous potassium hydroxide solution on cooling, and then 80 ml. of ice-water is added to the mixture. To this mixture is added dropwise, diazonium salt solution prepared from 53.3 g. of p-chloro-aniline, 180 ml. of conc. hydrochloric acid, 28.8 g. of sodium nitrite and 275 ml. of water, below 5° C. After addition, the reaction mixture is stirred below 5° C. The separated oily product solidifies gradually, and the solid product is then collected by filtration, washed with water and dried to give 128.4 g. (92.2 percent) of ethyl α-(o-fluorobenzyl)-α-(p-chlorophenyl-azo)-acetoacetate, m.p. 55°–60° C. Recrystallization from ethanol is repeated for an analytical sample, m.p. 79°–80° C. Infrared absorption spectrum, $\nu_{max}^{Paraffin}$: 1,750, 1,715, 1,600, 1,580, 1,495 cm$^{-1}$.

To a solution of 100 ml. of conc. sulfuric acid in 900 ml. of isopropanol is added 526.5 g. of ethyl α-(o-fluorophenyl)-α-(p-chlorophenylazo) acetoacetate and then the mixture is heated under refluxing condition for 4 hours with stirring. The reaction mixture is cooled and the precipitate is collected by filtration, washed with water and dried to give 336 g. of ethyl 5-chloro-3-(o-fluorophenyl)-indole-2-carboxylate, m.p. 180°–186° C. The analytical sample is recrystallized from ethanol, m.p. 188°–189° C. Infrared absorption spectrum, $\nu_{max}^{Paraffin}$: 3,300, 1,690, 1,550, 1,492 cm$^{-1}$.

To a mixture of 43 g. of ethyl 5-chloro-3-(o-fluorophenyl)-indole-2-carboxylate, 20 g. of potassium hydroxide, 20 ml. of water and 100 ml. of acetone is added dropwise 26 g. dimethyl sulfate below 60° C. The mixture is stirred at room temperature for 1 hour. The solvent is removed under reduced pressure to an oil. The oily residue is washed with water and triturated with ethanol to give 44 g. of ethyl 1-methyl-5-chloro-3-(o-fluorophenyl)-indole-2-carboxylate, m.p. 75° C. A sample of said compound is recrystallized from ethanol, m.p. 76° C.

EXAMPLE 14

3-Phenyl-5-chloroindole-2-aldehyde

A mixture of 17.2 g. of 3-phenyl-5-chloroindole-2-methanol, 50 g. of manganese dioxide and 300 ml. of ether is stirred at 20° C. for 5 hours. The reaction mixture is filtered through a diatomaceous earth layer, and the manganese compound and diatomaceous earth layer are thoroughly washed with 1 l of tetrahydrofuran. The filtrate and washings are combined and concentrated to a white solid, which is recrystallized from ethanol to give 13 g. of 3-phenyl-5-chloroindole-2-aldehyde as pale yellow needles, m.p. 241°–242° C.

EXAMPLE 15

1-Methyl-3-phenyl-5-chloroindole-2-aldehyde

Using the procedure similar to that described in Example 14 but replacing the 3-phenyl-5-chloroindole-2-methanol by 1-methyl-3-phenyl-5-chloro-indole, there is obtained 1-methyl-3-phenyl-5-chloroindole-2-aldehyde, which is recrystallized from ethanol to give pale yellow needles, m.p. 159°–160° C.

EXAMPLE 16

1-Methyl-3-(o-fluorophenyl)-5-chloroindole-2-aldehyde

Using the procedure similar to that described in Example 14 but replacing the 3-phenyl-5-chloroindole-2-methanol, by 1-methyl-3-(o-fluorophenyl)-5-chloroindole-2-methanol, there is obtained 1-methyl-3-(o-fluorophenyl)-5-chloro-indole-2-aldehyde.

EXAMPLE 17

5-Chloro-3-phenyl-indole-2-carboxylic acid hydrazide

A mixture of 22 g. of ethyl 5-chloro-3-phenyl-indole-2-carboxylate and 100 ml. of hydrazine hydrate (99–100 percent) is heated under reflux for 40 minutes. The mixture is cooled and the precipitate is collected by filteration, washed with water and dried to give 18.7 g. of 5-chloro-3-phenyl-indole-2-carboxylic acid hydrazide, m.p. 225°–228° C. as fine needles. From the filtrate and washings, 0.6 g. of the second crop is obtained.

EXAMPLE 18

5-Chloro-1-methyl-3-phenyl-indole-2-carboxylic acid hydrazide

Using the procedure similar to that described in Example 17, but replacing ethyl 5-chloro-3-phenyl-indole-2-carboxylate by ethyl 5-chloro-1-methyl-3-phenyl-indole-2-carboxylate, there is obtained 5-chloro-1-methyl-3-phenyl-indole-2-carboxylic acid hydrazide quantitatively, which is recrystallized from ethanol, m.p. 170°–173° C.

EXAMPLE 19

1-(7-Chloro-3-phenyl-2-indolylcarbonyl)-2-p-tolylsulfonyl hydrazine

To a mixture of 18.2 g. of 5-chloro-3-phenyl-indole-2-carboxylic acid hydrazide and 90 ml. dry pyridine is added portionwise 14.3 g. of p-toluenesulphonyl chloride at 10°–20° C. with stirring. The mixture is stirred at room temperature for 2 hours. After cooling, the mixture is poured into a mixture of 300 ml. of ice-water and 120 ml. of conc. hydrochloric acid. The precipitate is collected by filteration, washed with water and dried to 34 g. of crude 1-(7-chloro-3-phenyl-2-indolylcarbonyl)-2-p-tolyl-sulfonylhydrazine, m.p. 189°–197° C. Infrared absorption spectrum, $\nu_{max}^{Paraffin}$: 3,290, 1,665, 1,630, 1,592, 1,336, 1,160 cm$^{-1}$.

This crude product is used in the next step without further purification.

EXAMPLE 20

1-(7-Chloro-1-methyl-3-phenyl-2-indolylcarbonyl)-2-p-tolylsulfonyl hydrazine

Using the procedure similar to that in Example 19, but replacing 5-chloro-3-phenyl-indole-2-carboxylic acid hydrazide by 5-chloro-1-methyl-3-phenyl-2-carboxylic acid hydrazide, there is obtained 1-(7-chloro-1-methyl-3-phenyl-2-indolylcarbonyl)-2-p-tolylsulfonyl hydrazine.

EXAMPLE 21

5-Chloro-3-phenyl-indole-2-aldehyde

A mixture of 35.4 g. of the crude 1-(7-chloro-3-phenyl-2-indolylcarbonyl)-2-p-tolylsulfonylhydrazine obtained in Example 19, 26.2 g. of anhydrous sodium carbonate and 250 ml. of glycerin is heated in an oil bath to 150° C. with stirring, causing brisk effervescence. After stirring in the bath maintained at 160°–180° C. for 15 minutes, the mixture is cooled. To the mixture is added 300 ml. of water and the solid is collected by filteration washed with water, followed by ethanol and dried to give 20.7 g. of 5-chloro-3-phenyl-indole-2-aldehyde, which is recrystallized from ethanol, m.p. 239°–241° C. The infrared spectrum of this product is identical with that of the product obtained in Example 14.

EXAMPLE 22

Using the procedure similar to that described in Example 21, but replacing 1-(7-chloro-3-phenyl-2-indolyl-carbonyl)-2-p-tolylsulfonylhydrazine by 1-(7-chloro-1-methyl-3-phenyl-2-indolylcarbonyl)-2-p-tolylsulfonyl-hydrazine, there is obtained 5-chloro-1-methyl-3-phenyl-indole-2-aldehyde. The infrared spectrum of this product is identical with that of the product obtained in Example 15.

EXAMPLE 23

5-Chloro-2-(2'-nitrovinyl)-3-phenylindole

A solution of 10 g. of sodium hydroxide in 100 ml. of methanol is added dropwise to a solution of 3.2 g. of 5-chloro-3-phenylindole-2-carboxyaldehyde and 4 g. nitromethane and 60 ml. of tetrahydrofuran with stirring at 5° C. After stirring at 5° C. for 1 hour, the reaction mixture is added dropwise to a solution of 50 ml. of concentrated hydrochloric acid in 300 ml. of ice water. The precipitate is collected by filtration washed with water and dried to give 3.6 g. of 5-chloro-2-(2'-nitrovinyl)-3-phenylindole. Recrystallized from benzene gives 3.1 g. of reddish orange crystals, m.p. 267°–268° C. Infrared absorption spectrum, $\lambda_{max}^{Paraffin}$: 3,300, 1,605 cm$^{-1}$.

EXAMPLE 24

5-Chloro-2-(2'-nitrovinyl)-3-phenylindole

To a mixture of 2.4 g. of 5-chloro-3-phenylindole-2-aldehyde, 3 g. of nitromethane, 50 ml. of tetrahydrofuran and 50 ml. of methanol is added dropwise 17 g. of 40 percent methanol solution of Triton B (trade name for an emulsifier) at 5° C., and the mixture is stirred at 5° C. for 1 hour. Thereafter, the reaction mixture is treated in the manner similar to that in Example 23 to give 2.8 g. of 5-chloro-2-(2'-nitrovinyl)-3-phenylindole.

EXAMPLE 25

1-Methyl-5-chloro-2-(2'-nitrovinyl)-3-phenylindole

Using the similar manner to that described in Example 23, but replacing the 5-chloro-3-phenylindole-2-carboxaldehyde, by 5-chloro-1-methyl-3-phenyl-indole-2-carboxyaldehyde, there is obtained 1-methyl-5-chloro-2-(2'-nitrovinyl)-3-phenylindole, which is recrystallized from benzene-hexane to give reddish orange needles, m.p. 179°–180° C.

EXAMPLE 26

1-Methyl-5-chloro-2-(2'-nitrovinyl)-3-(o-fluorophenyl)-indole

Using the procedure similar to that described in Example 24, but replacing 5-chloro-3-phenyl-indole-2-aldehyde by 5-chloro-3-(o-fluorophenyl)-1-methyl-indole-2-aldehyde, there is obtained 1-methyl-5-chloro-2-(2'-nitrovinyl)-3-(o-fluorophenyl)-indole.

EXAMPLE 27

2-(2'-Aminoethyl)-3-phenyl-5-chloroindole acetate

To a suspension of 12 g. of lithium-aluminum hydride in 300 ml. of dry ether is added portionwise 6.5 g. of 5-chloro-2-nitrovinyl-3-phenylindole, with stirring at room temperature. After stirring under reflux for 5 hours, the reaction mixture was cooled with ice, and carefully decomposed by addition of water. The etheral solution is separated, washed with water, and dried over sodium sulfate, and the solvent is removed under reduced pressure to give 5.8 g. of pale yellow solid.

This solid is dissolved in 5 cc. of acetic acid and 30 cc. of benzene, and the solution was evaporated to dryness at 30° C. under reduced pressure. The residue is allowed to stand to crystallize. To the residue, 50 cc. of benzene is added, and the crystals is collected by filteration to give 4.8 g. of 2-(2'-aminoethyl)-3-phenyl-5-chloroindole acetate as white needles, m.p. 156°–157° C. Infrared absorption spectrum, $\lambda_{max}^{Paraffin}$: 3,200, 2,700–2,400, 1,695, 1,600, 1,650, 1,500 cm$^{-1}$.

EXAMPLE 28

Using the procedure similar to that described in Example 27, but replacing 5-chloro-2-nitrovinyl-3-phenyl-indole and acetic acid by 1-methyl-5-chloro-2-nitrovinyl-3-phenyl-indole and ethanolic hydrogen chloride, there is obtained 2-(2'-aminoethyl)-5-chloro-1-methyl-3-phenyl-indole hydrochloride, which is recrystallized from ethanol, m.p. 259°–260° C.

EXAMPLE 29

Using the procedure similar to that described in Example 27, but replacing 5-chloro-2-nitrovinyl-3-phenyl-indole and acetic acid, by 1-methyl-5-chloro-2-(2'-nitro-vinyl)-3-(o-fluorophenyl)-indole and ethanolic hydrogen chloride, there is obtained 2-(2'-aminoethyl)-5-chloro-3-(o-fluorophenyl)-1-methyl-indole hydrochloride.

EXAMPLE 30

5-Chloro-2-(2'-aminoethyl)-1-methyl-3-phenyl-indole-hydrochloride

To a suspension of 2 g. of lithium-aluminum hydride in 200 ml. of dry ether is added a solution of 5 g. of 5-chloro-1-methyl-3-phenylindole-2-acetonitrile in 50 ml. of dry ether at 10° C. The reaction mixture is stirred at 20° C. for 2 hours, and is decomposed by careful addition of water. The ethereal layer is separated by decantation, and treated with 6N-hydrochloric acid, whereby crystals are deposited. The crystals are collected by filtration, and washed with ether to give 5-chloro-2-(2'-aminoethyl)-1-methyl-3-phenylindole hydrochloride. When recrystallized from ethanol, the thus obtained hydrochloride shows a melting point of

EXAMPLE 31

Using the procedure similar to that in described in Example 30, but replacing 5-chloro-2-cyanomethyl-1-methyl-3-phenyl-indole by 5-chloro-2-cyanomethyl-3-phenyl-indole, there is obtained 2-(2'-aminoethyl)-5-chloro-3-phenyl-indole as an oil, which is treated with acetic acid to give 2-(2'-aminoethyl)-5-chloro-3-phenyl-indole acetate. The infrared spectrum of this compound is identical with that of the product obtained in Example 27.

EXAMPLE 32

1-Methyl-2-oxo-6-phenyl-8-chloro-1,2,3,4-tetrahydro-1,5-benzodiazocine

To a suspension of 2 g. of 1-methyl-2-(2'-aminoethyl)-3-phenyl-5-chloroindole hydrochloride in 20 ml. of glacial acetic acid is added dropwise a solution of 2 g. of chromic anhydride in 2 ml. of water at 10° C.

The reaction mixture is stirred at 20° C. for 16 hours into a solution. The solution is poured into 300 ml. of ice water, and extracted with chloroform. The chloroform layer is washed with water and dried over sodium sulfate, and the chloroform is removed by distillation. The residue is treated with a small amount of ether to give 0.9 g. of a yellow powder. Infrared absorption spectrum: $\lambda_{max}^{Nujol}$ (cm$^{-1}$): 1,720 (NCO), 1,665 (CO).

The mixture of 0.7 g. of this yellow powder and 20 ml. of pyridine containing a small amount of hydrochloric acid is refluxed for 30 hours. The pyridine is removed under reduced pressure and the residue is treated with water and extracted with ethyl acetate. The extract is thoroughly washed with water and dried over sodium sulfate, and the solvent is removed. The residue is recrystallized from aqueous ethanol to give 1-methyl-2-oxo-6-phenyl-8-chloro-1,2,3,4-tetrahydro-1,5-benzodiazocine as pale yellow crystals, m.p. 175°–180° C.

EXAMPLE 33

2-Oxo-6-phenyl-8-chloro-1,2,3,4-tetrahydro-1,5-benzodiazocine

Using the procedure similar to that described in Example 32, but replacing 1-methyl-2-(2'-aminoethyl)-3-phenyl-5-chloro-indole hydrochloride by 2-(2'-aminoethyl)-3-phenyl-5-chloro-indole acetate, there is obtained 2-oxo-6-phenyl-8-chloro-1,2,3,4-tetrahydro-1,5-benzodiazocine.

EXAMPLE 34

1-Methyl-2-oxo-6-(o-fluorophenyl)-8-chloro-1,2,3,4-tetrahydro-1,5-benzodiazocine Using the procedure similar to that described in Example 32, but replacing 1-methyl-2-(2'-aminoethyl)-3-phenyl-5-chloro-indole hydrochloride by 1-methyl-2-(2'-aminoethyl-3-(o-fluorophenyl)-5-chloro-indole hydrochloride, there is obtained 1-methyl-2-oxo-6-(o-fluorophenyl)-8-chloro-1,2,3,4-tetrahydro-1,5-benzodiazocine.

EXAMPLE 35

1-Methyl-2-oxo-7-phenyl-9-chloro-1,2,3,4,5-pentahydro-1,6-benzodiazonine

To a suspension of 2 g. of 1-methyl-2-(3'-aminopropyl)-3-phenyl-5-chloroindole hydrochloride in 20 ml. of glacial acetic acid is added a solution of 2 g. of chromic anhydride in 2 ml. of water at 10° C. The mixture is treated in the manner similar to that in Example 32 to give 0.5 g. of 1-methyl-2-oxo-7-phenyl-9-chloro-1,2,3,4,5-pentahydro-1,6-benzodiazonine, which is recrystallized from anhydrous ethanol to give pale yellow crystals, m.p. 201°–206° C. (decomp.).

What we claim is:

1. A process for preparing nitrogen-containing heterocyclic compounds, and acid addition salt thereof, represented by the formula,

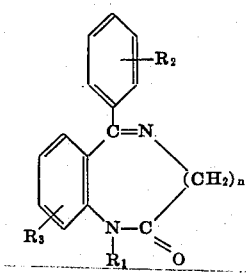

wherein $R_1$ signifies a hydrogen atom or a lower alkyl having up to two carbon atoms; $R_2$ and $R_3$ each signifies a hydrogen or halogen atom, and $n$ signifies 2 or 3, which comprises contacting an aminoalkylindole derivative, or an acid addition salt thereof, represented by the formula:

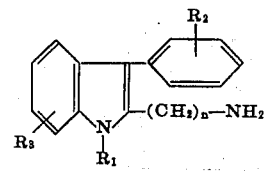

wherein $R_1$, $R_2$, $R_3$ and $n$ are as defined above with an oxidizing agent selected from the group consisting of ozone, hydrogen peroxide, peracetic acid, perbenzoic acid, chromic acid and potassium permanganate.

2. A process according to claim 1, wherein the acid addition salt of said nitrogen-containing heterocyclic compounds and said aminoalkylindole derivative is a hydrochloric, hydrobromic, sulfuric, nitric, phosphoric, maleic, fumaric, succinic, formic or acetic acid addition salt.

3. A process for preparing nitrogen-containing heterocyclic compounds, and acid addition salt thereof, represented by the formula:

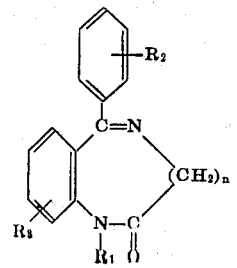

wherein $R_1$ signifies a hydrogen atom or a lower alkyl group having up to two carbon atoms; $R_2$ and $R_3$ each signifies a hydrogen or halogen atom, and $n$ signifies 2 or 3, which comprises reducing an indole-aliphatic acid amide derivative represented by the formula:

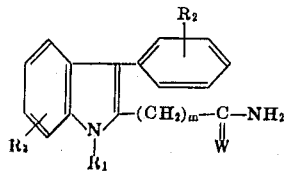

wherein $R_1$, $R_2$, $R_3$ and $R_4$ are as defined above, $m$ signifies 1 or 2, and W represents an oxygen or sulfur atom; and contacting the resulting 2-aminoalkyl indole derivative, or an acid addition salt thereof, represented by the formula:

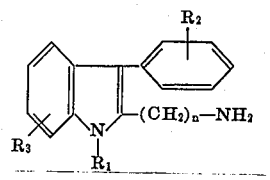

wherein $R_1$, $R_2$, $R_3$ and $n$ are as defined above with an oxidizing agent selected from the group consisting of ozone, hydrogen peroxide, peracetic acid, perbenzoic acid, chromic acid and potassium permanganate.

4. A process according to claim 3, wherein said indole-aliphatic acid amide derivative is reduced by electrolytic reduction, reduction with alkali metals in alcohols, catalytic reduction in the presence of a metal catalyst or reduction with a metal hydride complex.

5. A process according to claim 3, wherein the acid addition salt of said nitrogen-containing heterocyclic compounds and said 2-aminoalkylindole derivative is a hydrochloric, hydrobromic, sulfuric, nitric, phosphoric, maleic, fumaric, succinic, formic or acetic acid addition salt.

6. A process for preparing a nitrogen-containing heterocyclic compound, and an acid addition salt thereof, represented by the formula:

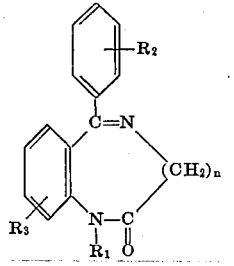

wherein $R_1$ signifies a hydrogen atom or a lower alkyl group having up to two carbon atoms; $R_2$ and $R_3$ each signifies a hydrogen or halogen atom; and $n$ signifies 2 or 3, which comprises reacting ammonia with an indole-aliphatic acid represented by the formula:

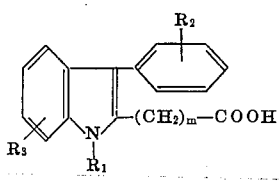

wherein $R_1$, $R_2$ and $R_3$ are as defined above and $m$ is 1 to 2, or the acid halide, ester or anhydride thereof in the presence of a solvent and reducing the resulting indole-aliphatic acid amide derivative represented by the formula:

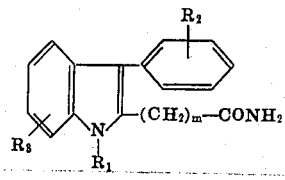

wherein $R_1$, $R_2$, $R_3$ and $m$ are as defined above, and then contacting the resulting aminoalkylindole derivative, or acid addition salt thereof as defined above, represented by the formula:

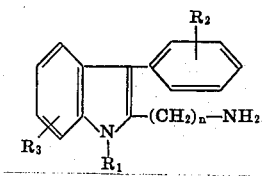

wherein $R_1$, $R_2$, $R_3$ and $n$ are as defined above with an oxidizing agent selected from the group consisting of ozone, hydrogen peroxide, peracetic acid, perbenzoic acid, chromic acid and potassium permanganate.

7. A process according to claim 6, wherein the acid addition salt of said nitrogen-containing heterocyclic compounds and said aminoalkylindole derivative is a hydrochloric, hydrobromic, sulfuric, nitric, phosphoric, maleic, fumaric, succinic, formic or acetic acid addition salt.

8. A process according to claim 6 wherein said solvent is selected from the group consisting of methanol, ethanol, ether, acetone, benzene, toluene, xylene, chlorobenzene, chloroform and ammonia.

9. A process according to claim 6 wherein said indole-aliphatic acid amide derivative is reduced by electrolytic reduction, reduction with alkali metals in alcohols, catalytic reduction in the presence of a metal catalyst or reduction with a metal hydride complex.

10. A process for preparing a benzodiazocine derivative represented by the formula:

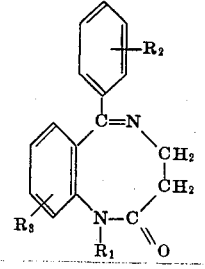

wherein $R_1$ signifies a hydrogen atom or a lower alkyl group having up to two carbon atoms; $R_2$ and $R_3$ each signifies a hydrogen or halogen atom; and $n$ signifies 2 or 3, which comprises reducing a cyanomethyl-indole derivative, or an acid addition salt thereof, represented by the formula:

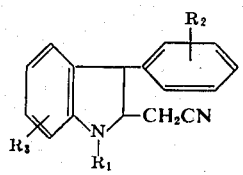

wherein $R_1$, $R_2$ and $R_3$ are as defined above; and contacting the resulting aminoethyl-indole derivative, or an acid addition salt thereof, represented by the formula:

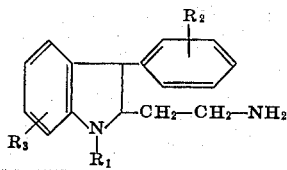

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

11. A process according to claim 10 wherein said cyanomethyl indole derivative is reduced by electrolytic reduction, reduction with alkali metals in alcohols, catalytic reduction using palladium-, nickel- or platinum-system catalysts, reduction using chromous acetate-alkali or reduction using metal hydride complexes.

12. A process according to claim 10 wherein the acid addition salt of said aminoethylindole derivative and said cyanomethyl-indole derivative is a hydrochloric, hydrobromic, sulfuric, nitric, phosphoric, maleic, fumaric, succinic, formic or acetic acid addition salt.

13. A process for preparing a benzodiazocine derivative represented by the formula:

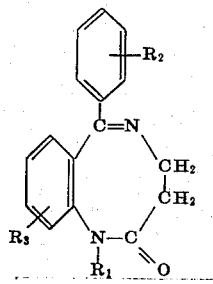

wherein $R_1$ signifies a hydrogen atom or a lower alkyl group having up to two carbon atoms; $R_2$ and $R_3$ each signifies a hydrogen or halogen atom, which comprises reacting with a metal cyanide in the presence of a solvent a quaternary ammonium salt represented by the formula:

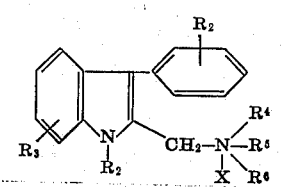

wherein $R_1$, $R_2$ and $R_3$ are as defined above, each of $R_4$, $R_5$ and $R_6$ signifies a lower alkyl group; and X is a halogen atom, and reducing the resulting cyanomethyl-indole derivative represented by the formula:

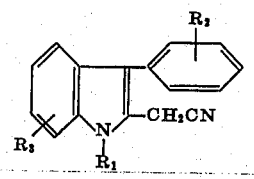

wherein $R_1$, $R_2$ and $R_3$ are as defined above; and contacting the resulting aminoethyl-indole derivative, or acid addition salt thereof, represented by the formula:

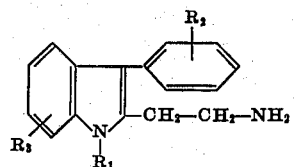

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

14. A process according to claim 13 wherein said solvent is a solvent selected from the group consisting of lower alcohols, dioxane, pyridine, dimethylsulfoxide and tetrahydrofuran.

15. A process according to claim 13 wherein the acid addition salt of said aminoethylindole derivative is hydrochloric, hydrobromic, sulfuric, nitric, phosphoric maleic, fumaric, succinic, formic or acetic acid addition salt.

16. A process for preparing a benzodiazocine derivative represented by the formula:

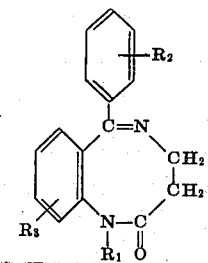

wherein $R_1$ signifies hydrogen atom or a lower alkyl group having up to two carbon atoms; $R_2$ and $R_3$ each signifies a hydrogen or halogen atom, which comprises reacting an N-dialkyl amino methylindole derivative, or an acid addition salt thereof, represented by the formula:

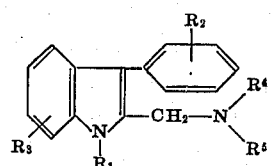

wherein $R_1$, $R_2$ and $R_3$ are as defined above, $R_4$ and $R_5$ each signifies a lower alkyl group with an alkylhalide represented by the formula:

$$R^6 - X$$

wherein $R^6$ signifies a lower alkyl group and X is halogen atom, and reacting with a metal cyanide the resulting quaternary ammonium salt represented by the formula:

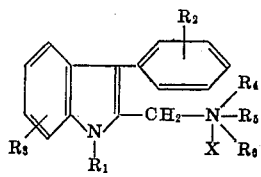

wherein $R_1$, $R_2$, $R_3$, $R_4$, $R_5$, $R_6$ and X are as defined above, and then reducing the resulting cyanomethyl-indole derivative represented by the formula:

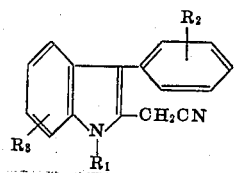

wherein $R_1$, $R_2$ and $R_3$ are as defined above; and then contacting the resulting aminoethyl-indole derivative, or an acid addition salt thereof, represented by the formula:

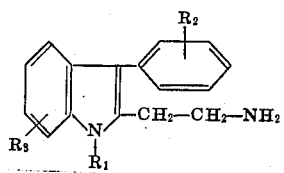

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

17. A process according to claim 16 wherein the acid addition salt of said N-dialkyl aminomethylindole derivative and said amonoethylindole derivative is a hydrochloric, hydrobromic, sulfuric, nitric, phosphoric, maleic, fumaric, succinic, formic or acetic acid addition salt.

18. A process according to claim 16 wherein said N-dialkyl aminomethylindole derivative is reacted in a solvent selected from the group consisting of toluene, benzene, ethylacetate, acetone, acetonitrile, ether or alcohol.

19. A process according to claim 16 wherein said N-dialkyl aminomethylindole derivative is reacted with said alkyl halide by heating.

20. A process for preparing a benzodiazocine derivative represented by the formula:

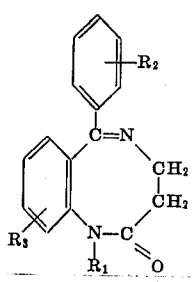

wherein $R_1$ signifies a hydrogen atom or a lower alkyl group having up to two carbon atoms; $R_2$ and $R_3$ each signifies a hydrogen or halogen atom, which comprises reducing an indole-carboxamide derivative represented by the formula:

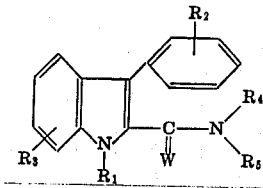

wherein $R_1$, $R_2$ and $R_3$ are as defined above, $R_4$ and $R_5$ each signifies a lower alkyl group, and W signifies an oxygen or sulfur atom, and reacting the resulting dialkyl-amino methylindole derivative, or an acid addition salt thereof, represented by the formula:

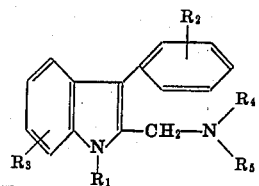

wherein $R_1$, $R_2$, $R_3$, $R_4$ and $R_5$ are as defined above with an alkyl halide represented by the formula:

$$R_6 - X$$

wherein $R_6$ signifies a lower alkyl and X is a halogen atom, and then reacting with a metal cyanide the resulting quaternary salt represented by the formula:

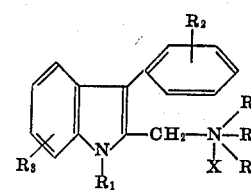

wherein $R_1$, $R_2$, $R_3$, $R_4$, $R_5$, $R_6$ and X are as defined above, and then reducing the resulting cyanomethyl-indole derivative represented by the formula:

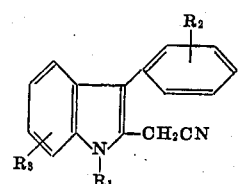

wherein $R_1$, $R_2$ and $R_3$ are as defined above; and then contacting the resulting aminoethyl-indole derivative, or an acid addition salt thereof as defined above, represented by the formula:

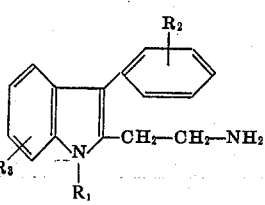

wherein R₁, R₂ and R₃ are as defined above with an oxidizing agent selected from the group consisting of ozone, hydrogen peroxide, peracetic acid, perbenzoic acid, chromic acid and potassium permanganate.

21. A process according to claim 20 wherein said indole-carboxamide derivative is reduced by electrolytic reduction, reduction with alkali metals in alcohols, catalytic reduction in the presence of a metal catalyst or reduction with a metal hydride complex.

22. A process according to claim 20 wherein the acid addition salt of dialkyl aminomethylindole derivative and said resulting aminoethylindole derivative is a hydrochloric, hydrobromic, sulfuric, nitric, phosphoric, maleic, fumaric, succinic, formic or acetic acid addition salt.

23. A process according to claim 20 wherein said dialkyl aminomethylindole derivative is reacted with said alkyl halide in the presence of a solvent selected from the group consisting of toluene, benzene, ethylacetate, acetone, acetonitrile, ether and alcohol.

24. A process according to claim 20 wherein said dialkyl aminomethylindole derivative is reacted with said alkyl halide by heating.

25. A process according to claim 20 wherein said cyanomethyl indole derivative is reduced by electrolytic reduction, reduction by alkali metal in alcohols, catalytic reduction in the presence of platinum, palladium or nickel catalyst or reduction with metal hydride complex compound.

26. A process for preparing a benzodiazocine derivative represented by the formula:

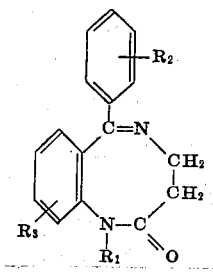

wherein R₁ signifies a hydrogen atom or a lower alkyl having up to two carbon atoms; R₂ and R₃ each signifies a hydrogen or halogen atom, which comprises reducing nitro-alkenyl-indole derivative represented by the formula:

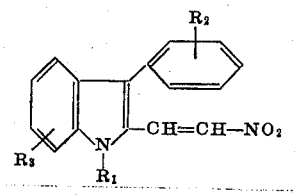

wherein R₁, R₂ and R₃ are as defined above, and then contacting the resulting aminoalkylindole derivative, or an acid addition salt thereof, represented by the formula:

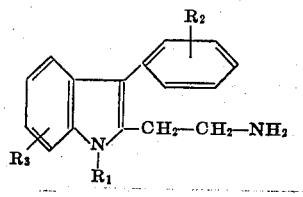

wherein R₁, R₂ and R₃ are as defined above with an oxidizing agent selected from the group consisting of ozone, hydrogen peroxide, peracetic acid, perbenzoic acid, chromic acid and potassium permanganate.

27. A process according to claim 26 wherein said nitroalkenyl indole derivative is reduced by electrolytic reduction, catalytic reduction in the presence of a metal catalyst or reduction with a metal hydride complex.

28. A process according to claim 26 wherein the acid addition salt of said amino alkylindole derivative is a hydrochloric, hydrobromic, sulfuric, nitric, phosphoric, maleic, fumaric, succinic, formic or acetic acid addition salt.

29. A process for preparing a benzodiazocine derivative represented by the formula:

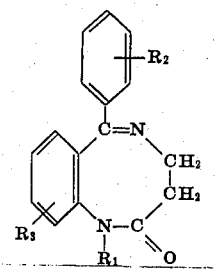

wherein R₁ signifies a hydrogen atom or a lower alkyl having up to two carbon atoms; R₂ and R₃ each signifies a hydrogen or halogen atom, which comprises reacting an indole-2-aldehyde derivative represented by the formula:

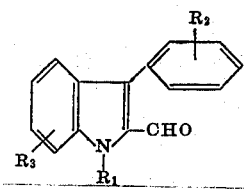

wherein R₁, R₂ and R₃ are as defined above with a nitromethane, and reducing the resulting nitro-alkenyl-indole derivative represented by the formula:

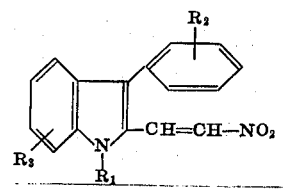

wherein R₁, R₂ and R₃ are as defined above; and then contacting the resulting aminoalkylindole derivative, or acid addition salt thereof, represented by the formula:

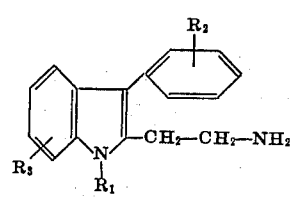

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

30. A process according to claim 29 wherein said indole-2-aldehyde is reacted with said nitromethane in the presence of a basic catalyst selected from the group consisting of ethylamine, n-butylamine, amylamine, cyclohexylamine, aniline, ammonium acetate, Triton B, caustic soda, caustic potash and sodium alcoholates.

31. A process according to claim 29 wherein said acid addition salt of said aminoalkylindole derivative is a hydrochloric, hydrobromic, sulfuric, nitric, phosphoric, maleic, fumaric, succinic, formic or acetic acid addition salt.

32. A process for preparing a benzodiazocine derivative represented by the formula:

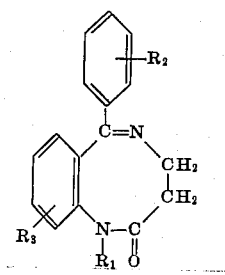

wherein $R_1$ signifies a hydrogen atom or a lower alkyl having up to two carbon atoms; $R_2$ and $R_3$ each signifies a hydrogen or halogen atom, which comprises oxidizing an indole-methanol derivative represented by the formula:

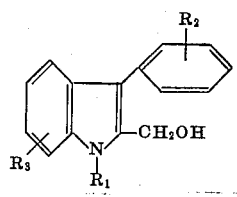

wherein $R_1$, $R_2$ and $R_3$ are as defined above with chromic acid, manganese dioxide, selenium dioxide, nitric acid, nitrogen dioxide or permanganate in a solvent and reacting with a nitro-methane the resulting indole-aldehyde derivative represented by the formula:

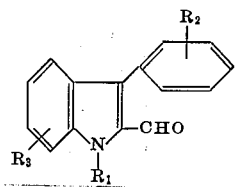

wherein $R_1$, $R_2$ and $R_3$ are as defined above; reducing the resulting nitro-alkenyl-indole derivative represented by the formula:

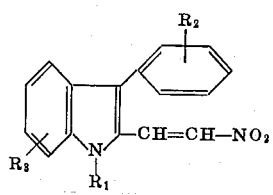

wherein $R_1$, $R_2$ and $R_3$ are as defined above; and then contacting the resulting aminoalkylindole derivative, or acid addition salt thereof, represented by the formula:

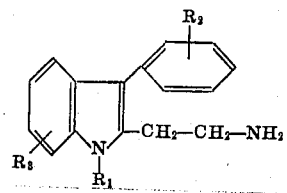

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

33. A process according to claim 32 wherein said solvent is selected from the group consisting of benzene, ether, tetrahydrofuran, petroleum ether, acetone, chloroform, acetic acid, water and sulfuric acid.

34. A process according to claim 32 wherein said acid addition salt of said aminoalkylindole derivative is a hydrochloric, hydrobromic, sulfuric, nitric, phosphoric, maleic, fumaric, succinic, formic or acetic acid addition salt.

35. A process for preparing a benzodiazocine derivative represented by the formula:

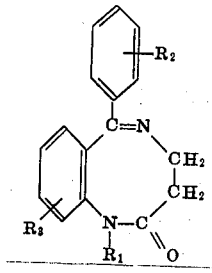

wherein $R_1$ signifies a hydrogen atom or a lower alkyl group having up to two carbon atoms; $R_2$ and $R_3$ each signifies a hydrogen or halogen atom, which comprises reducing an indole-2-carboxylic acid derivative or ester thereof represented by the formula:

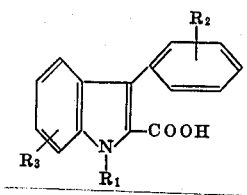

wherein $R_1$, $R_2$ and $R_3$ are as defined above; and oxidizing the resulting indole-methanol derivative represented by the formula:

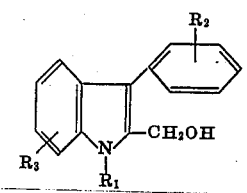

wherein $R_1$, $R_2$ and $R_3$ are as defined above; and then reacting with a nitro-methane, the resulting indole-2-aldehyde derivative represented by the formula:

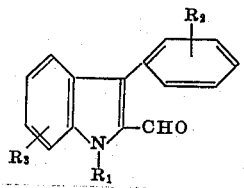

wherein $R_1$, $R_2$ and $R_3$ are as defined above; and then reducing the resulting nitroalkenylindole derivative represented by the formula:

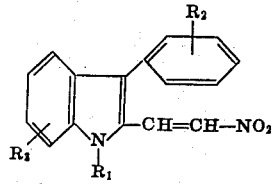

wherein $R_1$, $R_2$ and $R_3$ are as defined above; and then contacting the resulting aminoalkylindole derivative, or an acid addition salt thereof, represented by the formula:

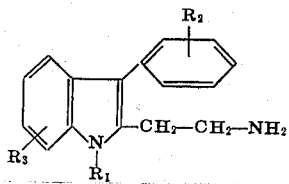

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

36. A process according to claim 35 wherein said indole-2-carboxylic acid derivative is reduced by reduction with alkali metals, catalytic reduction with nickel, copper chromium or copper oxide as a catalyst or reduction with metal hydride complexes.

37. A process according to claim 36 wherein the acid addition salt of said aminoalkylindole derivative is a hydrochloric, hydrobromic, sulfuric, nitric, phosphoric, maleic, fumaric, succinic, formic or acetic acid addition salt.

38. A process for preparing a benzodiazocine derivative represented by the formula:

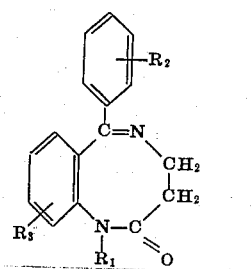

wherein $R_1$ signifies a hydrogen atom or a lower alkyl group having up to two carbon atoms, and $R_2$ and $R_3$ each signifies a hydrogen or halogen atom, which comprises treating an indole-2-carboxylic acid derivative represented by the formula:

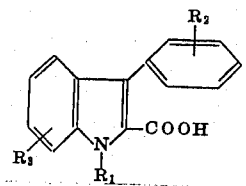

wherein $R_1$, $R_2$ and $R_3$ are as defined above, or halide, anhydride or ester thereof with hydrazine, and treating the resulting indole-2-carboxylic acid hydrazine derivatives represented by the formula:

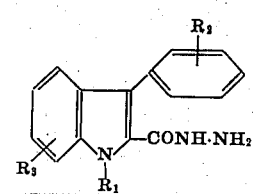

wherein $R_1$, $R_2$ and $R_3$ are as defined above, with p-tolyl-sulfonyl halide, and heating the resulting 1-indolylcarbonyl-2-p-tolylsulfonylhydrazine derivative represented by the formula:

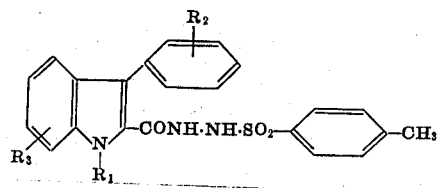

wherein $R_1$, $R_2$ and $R_3$ are as defined above, and then reacting, with a nitromethane, the resulting indole-2-aldehyde derivative represented by the formula:

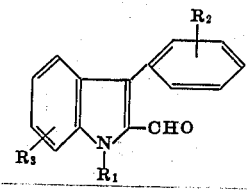

wherein $R_1$, $R_2$ and $R_3$ are as defined above; and then reducing the resulting nitroalkenylindole derivative represented by the formula:

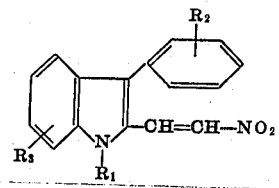

wherein $R_1$, $R_2$ and $R_3$ are as defined above; and then contacting the resulting aminoalkylindole derivative, or acid addition salt thereof, represented by the formula:

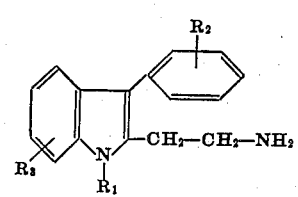

wherein $R_1$, $R_2$ and $R_3$ are as defined above with an oxidizing agent selected from the group consisting of ozone, hydrogen peroxide, peracetic acid, perbenzoic acid, chromic acid and potassium permanganate.

39. A process according to claim 38 wherein said treating with hydrazine is in the presence of methanol, ethanol, benzene, toluene or an excess amount of hydrazine hydrate.

40. A process according to claim 38 wherein said treating p-tolyl sulfonyl halide is in the presence of a basic agent selected from the group consisting of pyridine and triethylamine.

41. A process according to claim 38 wherein the resulting 1-indolyl carbonyl-2-p-tolyl sulfonyl hydrazine is effected in the presence of a base agent selected from the group consisting of anhydrous sodium and potassium carbonates and in the presence of an inert solvent selected from the group consisting of ethylene glycol and glycerine at temperatures within the range of about 140° to 200°C.

42. A process according to claim 38 wherein the acid addition salt of said aminoalkyl indole derivative is a hydrochloric, hydrobromic, sulfuric, nitric, phosphoric, maleic, fumaric, succinic, formic or acetic acid addition salt.

* * * * *

UNITED STATES PATENT OFFICE
CERTIFICATE OF CORRECTION

Patent No. 3,697,508　　　　Dated October 10, 1972

Inventor(s) HISAO YAMAMOTO et al.

It is certified that error appears in the above-identified patent and that said Letters Patent are hereby corrected as shown below:

Please correct the misprinted name of the assignee to read as follows:

-- Sumitomo Chemical Co., Ltd. --

Signed and sealed this 29th day of May 1973.

(SEAL)
Attest:

EDWARD M. FLETCHER, JR.　　　　ROBERT GOTTSCHALK
Attesting Officer　　　　　　　　Commissioner of Patents